(12) United States Patent
Horiuchi et al.

(10) Patent No.: US 10,505,698 B2
(45) Date of Patent: Dec. 10, 2019

(54) COMMUNICATION APPARATUS AND CONTROL SIGNAL MAPPING METHOD

(71) Applicant: Panasonic Intellectual Property Corporation of America, Torrance, CA (US)

(72) Inventors: Ayako Horiuchi, Kanagawa (JP); Lilei Wang, Beijing (CN); Alexander Golitschek Edler Von Elbwart, Hessen (DE); Hidetoshi Suzuki, Kanagawa (JP); Kazuki Takeda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/203,179

(22) Filed: Nov. 28, 2018

(65) Prior Publication Data
US 2019/0097782 A1    Mar. 28, 2019

Related U.S. Application Data

(63) Continuation of application No. 15/611,394, filed on Jun. 1, 2017, now Pat. No. 10,171,225, which is a
(Continued)

(51) Int. Cl.
*H04L 5/00* (2006.01)
*H04W 52/32* (2009.01)
(Continued)

(52) U.S. Cl.
CPC .......... *H04L 5/0094* (2013.01); *H04L 1/0001* (2013.01); *H04L 5/0033* (2013.01);
(Continued)

(58) Field of Classification Search
CPC ... H04L 5/0094; H04L 5/0073; H04L 5/0035; H04L 5/0051; H04L 5/0033;
(Continued)

(56) References Cited

U.S. PATENT DOCUMENTS 9,686,110 B2 * 6/2017 Park .................... H04L 27/2613
2010/0238877 A1    9/2010 Nam et al.
(Continued)

FOREIGN PATENT DOCUMENTS

CN    102869096 A    1/2013
EP    2 464 076 A2   6/2012
(Continued)

OTHER PUBLICATIONS

Extended European Search Report, dated Mar. 31, 2016, for corresponding EP Application No. 13881138.5-2982051, 14 pages.
(Continued)

*Primary Examiner* — Vineeta S Panwalkar
(74) *Attorney, Agent, or Firm* — Seed IP Law Group LLP

(57) ABSTRACT

A communication apparatus includes control circuitry and a transmitter. In operation, the control circuitry selects a Demodulation Reference Signal (DMRS) mapping pattern from among a plurality of DMRS mapping patterns. The DMRS mapping patterns include a first DMRS mapping pattern with first DMRS resource elements to which first DMRSs in a first half of a subframe are mapped and second DMRS resource elements to which second DMRSs in a second half of the subframe are mapped. Also, in operation, the transmitter transmits downlink control information that includes a plurality of bits indicating the selected DMRS mapping pattern.

18 Claims, 17 Drawing Sheets

Related U.S. Application Data continuation of application No. 14/781,290, filed as application No. PCT/CN2013/073589 on Apr. 1, 2013, now Pat. No. 9,698,892.

(51) Int. Cl.
  *H04L 1/00* (2006.01)
  *H04L 27/26* (2006.01)
  *H04B 7/0452* (2017.01)

(52) U.S. Cl.
  CPC .......... *H04L 5/0035* (2013.01); *H04L 5/0051* (2013.01); *H04L 5/0073* (2013.01); *H04L 27/2646* (2013.01); *H04W 52/325* (2013.01); *H04B 7/0452* (2013.01); *H04L 1/0003* (2013.01); *H04L 1/0009* (2013.01); *H04L 5/0007* (2013.01); *H04L 5/0026* (2013.01)

(58) Field of Classification Search
  CPC . H04L 27/2646; H04L 1/0001; H04L 1/0003; H04L 1/0009; H04L 5/0026; H04L 5/0007; H04W 52/325; H04B 7/0452
  See application file for complete search history.

(56) References Cited

U.S. PATENT DOCUMENTS

| | | |
|---|---|---|
| 2011/0212730 A1 | 9/2011 | Wennstrom et al. |
| 2012/0250642 A1 | 10/2012 | Qu et al. |
| 2012/0300711 A1 | 11/2012 | Wang et al. |
| 2013/0034070 A1 | 2/2013 | Seo et al. |
| 2013/0265945 A1* | 10/2013 | He .................. H04W 60/04 370/329 |
| 2014/0098775 A1 | 4/2014 | Horiuchi et al. |
| 2015/0003356 A1 | 1/2015 | Seo et al. |
| 2016/0087709 A1 | 3/2016 | Horiuchi et al. |
| 2016/0183227 A1 | 6/2016 | Horiuchi et al. |

FOREIGN PATENT DOCUMENTS

| | | |
|---|---|---|
| JP | 2012-521138 A | 9/2012 |
| JP | 2016-518758 A | 6/2016 |
| WO | 2011/118993 A2 | 9/2011 |
| WO | 2013/024569 A1 | 2/2013 |

OTHER PUBLICATIONS

Huawei, HiSilicon, "Analysis and initial evaluation results for overhead reduction and control signaling enhancements," R1-130022, 3GPP TSG RAN WG1 Meeting #72, Agenda Item: 7.3.5.2, St. Julian's, Malta, Jan. 28-Feb. 1, 2013, 6 pages.

International Search Report dated Jan. 9, 2014, for corresponding International Application No. PCT/CN2013/073589, 2 pages.

Panasonic, "Discussion on PUSCH DMRS configuration and signaling," R1-122195, 3GPP TSG-RAN WG1 Meeting #69, Agenda Item: 7.5.6.1.1 Uplink reference signals (DMRS), Prague, Czech Republic, May 21-25, 2012, 4 pages.

Samsung, "Association between DMRS port and ePDCCH," R1-123489, 3GPP TSG RAN WG1 #70, Agenda Item: 7.6.4, Qingddao, China, Aug. 13-17, 2012, 5 pages.

ZTE, "DL Reference Signal Design for Demodulation in LTE-Advanced," R1-091435, 3GPP TSG RAN WG1 meeting #56bis, Agenda Item: 15.1, Seoul Korea, Mar. 23-27, 2009, 6 pages.

ZTE, "Downlink DMRS redunction for small cell," R1-130138, 3GPP TSG RAN WG1 Meeting #72, Agenda Item: 7.3.5.2, St. Julian's, Malta, Jan. 28-Feb. 1, 2013, 5 pages.

ZTE, "Downlink control signaling for CoMP," R1-124194, 3GPP TSG RAN WG1 Meeting #70bis, Agenda Item 7.4.1, Oct. 8-12, 2012, San Diego, USA, 6 pages.

* cited by examiner

COMMUNICATION APPARATUS AND CONTROL SIGNAL MAPPING METHOD

TECHNICAL FIELD

The present invention relates to a transmission apparatus and a control signal mapping method.

BACKGROUND ART

In recent years, transmitting not only speech data but also large volume data such as still image data and moving image data has become common along with the increasing adoption of multimedia-enabled information in cellular mobile communication systems. Meanwhile, studies have been actively carried out to achieve high transmission-rate communication using a wide radio band, multiple-input multiple-output (MIMO) transmission technology, and interference control technique in long term evolution advanced (LTE-Advanced).

In addition, studies have been carried out on achieving a high transmission rate at hotspots through deployment of small cells, each being a radio communication base station apparatus (hereinafter, abbreviated as "base station") using low transmission power in cellular mobile communication systems. Allocating a frequency different from that for macro cells as a carrier frequency for operating small cells has been also under study. A high frequency such as 3.5 GHz has become a candidate. When small cells and macro cells are operated using different frequencies, transmission signals from macro cells do not interfere with communication performed by small cells. Accordingly, the deployment of small cells can achieve high transmission-rate communication.

In LTE-Advanced, a cell-specific reference signal (CRS) or a demodulation reference signal (DMRS) is used as a reference signal (RS) used for demodulating a physical downlink shared channel (PDSCH), which corresponds to a data signal.

CRSs are also used for channel quality measurement in addition to demodulation of data signals while the number of antenna ports and the resource positions for CRSs are determined on a per cell basis. For this reason, it is difficult to change the amount of resources for the CRSs for each radio communication terminal apparatus (hereinafter, abbreviated as "terminal," which may be also called a user equipment (UE)).

Meanwhile, the number of antenna ports and the resource positions for DMRSs are determined on a per user basis, and DMRSs are mainly used for demodulating data signals. In addition, DMRSs mapped in resource block (RB) pairs for a different terminal (to be described, hereinafter) have no effect on signal assignment. For this reason, it is easier to optimize the amount of resources for DMRSs for each terminal.

Small cells provide coverage for low-mobility terminals and indoor terminals with a small delay spread, supposedly. The channel quality of these terminals is expected to be good. In this respect, studies have been carried out on further increasing the transmission rate through DMRS reduction for terminals having good channel quality and use of the resources that have become available as a result of reducing DMRSs, as a data region (see, Non-Patent Literatures (hereinafter, referred to as "NPL") 1 and 2).

(Explanation of Resources)

In LTE and LTE-Advanced, one RB consists of 12 subcarriers in the frequency-domain and 0.5 msec in the time-domain. A resource unit formed by combining two RBs in the time-domain is called an RB pair. Accordingly, an RB pair consists of 12 subcarriers and 1 mesc. An RB pair may be simply called an RB when the term is used for representing a group of 12 subcarriers in the frequency domain. In addition, an RB pair is called a physical RB (PRB) in the physical layer. Moreover, the first-half RB (0.5 msec) of a PRB pair is called a first slot, and the second-half RB (0.5 msec) of the PRB pair is called a second slot.

In addition, a unit consisting of one subcarrier and one OFDM symbol is called a resource element (RE). The number of OFDM symbols per RB pair varies depending on the CP length of OFDM symbols. In the case of normal CP, each RB pair includes 14 OFDM symbols. In the case of extended CP, each RB pair includes 12 OFDM symbols.

FIG. 1 illustrates a DMRS mapping pattern in the case of normal CP. When only antenna ports #7 and #8 are used, only 12 REs are allocated to DMRSs. When antenna port #9 is used at least, 24 REs are allocated to DMRSs. When antenna ports #7, #8, #9 and #10 are used, antenna ports #7 and #8 are CDMA multiplexed by means of orthogonal cover codes (OCCs) on the adjacent OFDM symbols of the same subcarrier and antenna ports #9 and #10 are CDMA multiplexed by means of OCCs on the adjacent OFDM symbols of the same subcarrier. Moreover, when antenna ports #11, #12, #13, and #14 are used, antenna ports #7, #8, #11, and #13 are CDMA multiplexed by means of orthogonal cover codes using four REs of the same subcarrier and antenna ports #9, #10, #12, and #14 are CDMA multiplexed by means of OCCs using four REs of the same subcarriers.

Multiple antenna ports are used in single user MIMO (SU-MIMO) and multi user MIMO (MU-MIMO). In SU-MIMO, antenna ports #7 to #14 can be used for a single terminal. However, only antenna ports #7 and #8 can be each used as a single antenna port, and for the number of antenna ports X (>1), antenna ports #7, #8, . . . #(X+6) are used. For example, when the number of antenna ports is 6, antenna ports #7, #8, #9, #10, #11, and #12 are used. MU-MIMO based on orthogonal multiplexing is achieved by multiplexing antenna ports #7 and #8 by means of OCCs. However, each terminal is only aware of allocation for the terminal and thus cannot know whether or not MU-MIMO is actually performed.

(Reduction in Frequency-Domain Direction)

FIGS. 2A and 2B illustrate an example of a DMRS mapping pattern in which DMRSs are reduced in the frequency-domain direction. Assigning this mapping pattern to a terminal in a reception environment where the change in channel quality in the frequency-domain is moderate, such as an environment where a terminal is located indoors and with a small delay spread can minimize the degradation of reception quality due to the reduction of DMRSs. For reducing DMRSs in the frequency-domain direction, multiplexing is performed using four REs of the same subcarriers. Thus, CDMA multiplexing of antenna ports #7, #8, #11, and #13 and CDMA multiplexing of antenna ports #9, #10, #12, and #14 can be supported.

(Reduction in Time-Domain Direction)

FIG. 3 illustrates an example of a DMRS mapping pattern in which DMRSs are reduced in the time-domain direction. Assigning this mapping pattern to a low-mobility terminal in a reception environment where the change in channel quality in the time-domain is moderate can minimize the degradation of reception quality due to the reduction of DMRSs. However, when antenna ports #7 to #14 are used, antenna ports #7, #8, #11, and #13 are to be CDMA multiplexed using four REs of the same subcarrier, and antenna ports #9,

10, #12, and #14 are to be CDMA multiplexed using four REs of the same subcarrier. Accordingly, antenna ports #11 to #14 cannot be supported by the current design.

CITATION LIST

Non-Patent Literatures

NPL 1
R1-130022 "Analysis and initial evaluation results for overhead reduction and control signaling enhancements"
NPL 2
R1-130138 "Downlink DMRS reduction for small cell"

SUMMARY OF INVENTION

Technical Problem

In operation where a terminal changes a connection-destination small cell every subframe, the reception quality also changes every small cell. Accordingly, the optimum DMRS pattern also changes every subframe.

However, the DMRS mapping method of the related art assumes that a fixed pattern is used to map DMRSs for all terminals. Accordingly, the method is not adapted to the reception environment that varies every terminal.

In addition, even if a certain base station attempts to increase the channel quality by increasing the DMRS power (power boosting) in the case where the same pattern is used to map DMRSs for a plurality of neighboring cells, it is difficult to increase the channel quality because the amount of interference increases when a base station forming another cell increases the DMRS power on the same resources.

It is an object of the present invention to provide a transmission apparatus and a control signal mapping method each of which enables high transmission-rate communication by mapping DMRSs in a way adapted to the reception environment of each terminal.

Solution to Problem

A transmission apparatus according to an aspect of the present invention includes: a reference signal configuration section that configures a demodulation reference signal (DMRS) mapping pattern for each reception apparatus; and a transmission section that transmits a transmission signal including information indicating the DMRS mapping pattern, and a DMRS mapped in a resource according to the DMRS mapping pattern.

A control signal mapping method according to an aspect of the present invention includes: configuring a demodulation reference signal (DMRS) mapping pattern for each reception apparatus; and transmitting a transmission signal including information indicating the DMRS mapping pattern and a DMRS mapped in a resource according to the DMRS mapping pattern.

Advantageous Effects of Invention

According to the present invention, a DMRS mapping pattern can be configured for each terminal, which makes it possible to map DMRSs in a way adapted to the reception environment of each terminal and thus to enable high transmission-rate communication.

DESCRIPTION OF EMBODIMENTS

Hereinafter, embodiments of the present invention will be described in detail with reference to the accompanying drawings. It should be noted that, the term "DMRS mapping pattern" used in the following description includes both of a pattern in which DMRSs are mapped in all of predetermined REs in each of which a DMRS can be mapped (hereinafter, referred to as "DMRS-mappable RE") and a pattern in which DMRSs are reduced by not mapping DMRSs in some of the predetermined DMRS-mappable REs according to a predetermined rule.

Embodiment 1

(Summary)

In Embodiment 1, a DMRS mapping pattern is indicated to each terminal by signaling using multiple bits. Each of the bits used in this signaling indicates whether or not to map and transmit DMRSs in a corresponding one of DMRS groups. Each of the DMRS groups is formed of a plurality of adjacent DMRS-mappable REs. When the number of DMRS antenna ports is at least three (i.e., when antenna port #9 is used), a DMRS group includes four adjacent REs corresponding to two REs in the subcarrier direction and two REs in the OFDM symbol direction. In addition, when the number of DMRS antenna ports is not greater than two, a DMRS group is configured to include two adjacent REs corresponding to one RE in the subcarrier direction and two REs in the OFDM symbol direction. Accordingly, a mapping pattern in which DMRSs are reduced in the time-domain direction can be assigned to a low-mobility terminal, and a mapping pattern in which DMRSs are reduced in the frequency-domain direction can be assigned to a terminal with a small delay spread.

(Normal CP)

Figure 1:
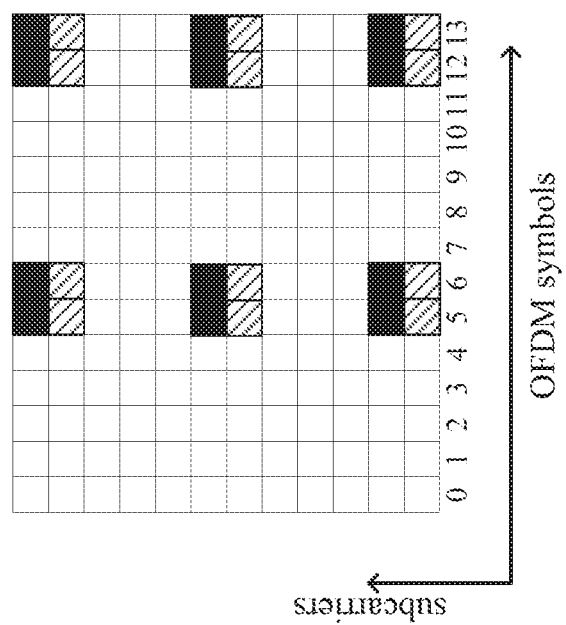
FIG. 1 is a diagram illustrating an example of how DMRSs are mapped.
Figure 2B:
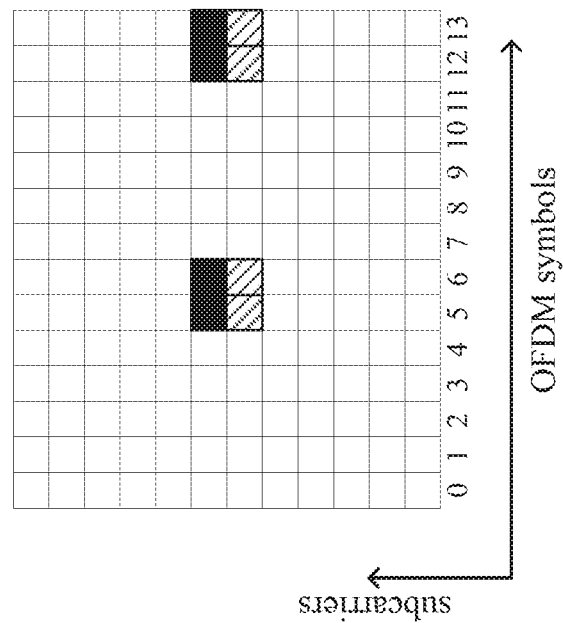
FIGS. 2A and 2B are diagrams illustrating an example of a mapping pattern in which DMRSs are reduced in the frequency-domain direction.
Figure 2A:
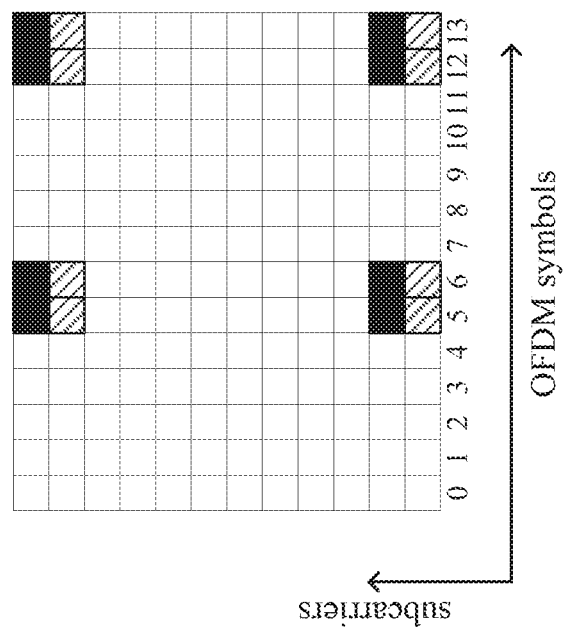
Figure 3:
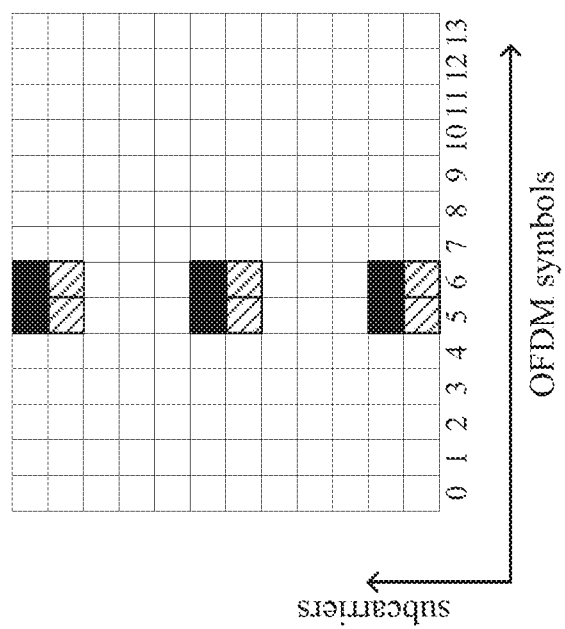
FIG. 3 is a diagram illustrating an example of a mapping pattern in which DMRSs are reduced in the time-domain direction.
Figure 4A:
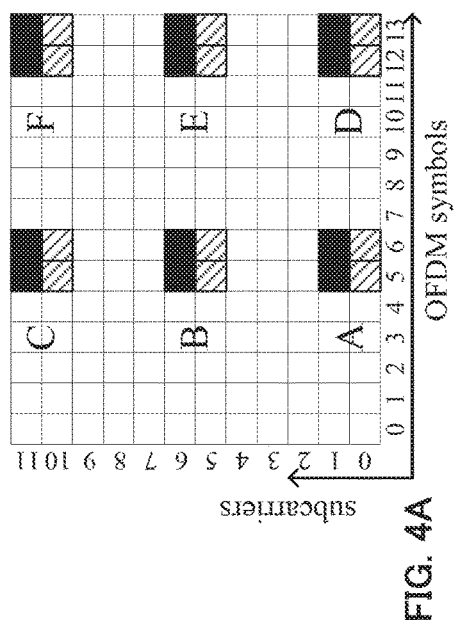
FIGS. 4A to 4D are diagrams illustrating DMRS mapping patterns and signaling in the case of normal CP and DL subframes, according to Embodiment 1 of the present invention.
Figure 4B:
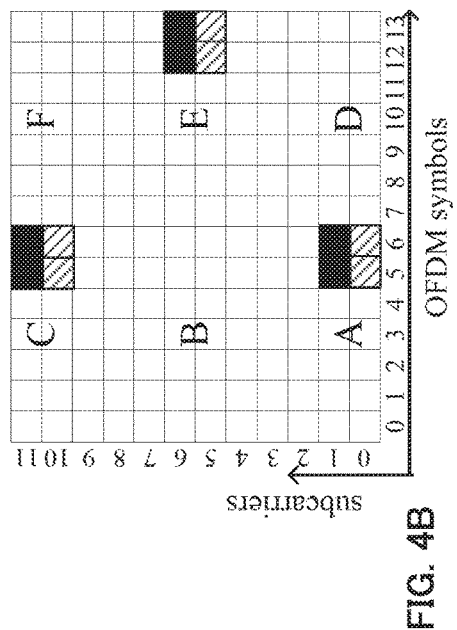
Figure 4C:
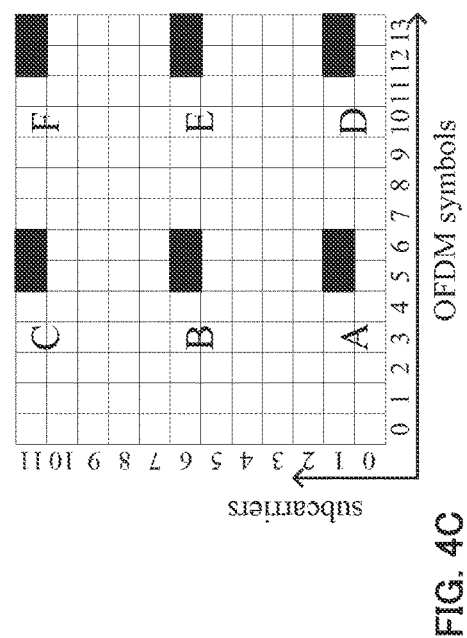
Figure 4D:
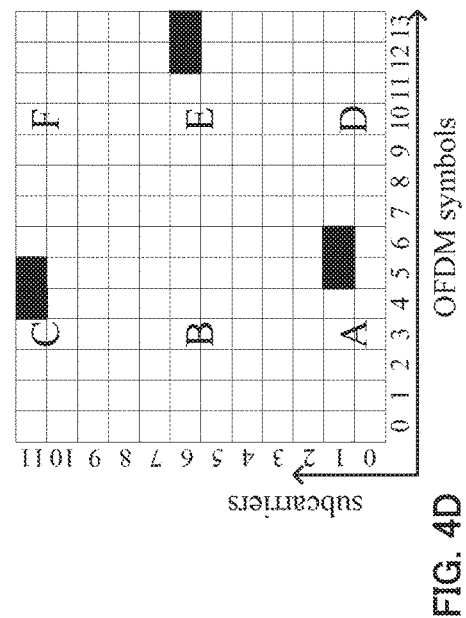

FIGS. 4A to 4D are diagrams illustrating DMRS mapping patterns and signaling in the case of normal CP and DL subframes. In the case of normal CP, the number of DMRS groups is set to six, and the DMRS groups are indicated by A, B, C, D, E, and F, respectively. FIGS. 4A and 4B illustrate patterns used when the number of antenna ports is at least three, while FIGS. 4C and 4D illustrate patterns used when the number of antenna ports is two or less. FIGS. 4A and 4C illustrate patterns in which no DMRS is reduced, while FIGS. 4B and 4D illustrate patterns in which DMRSs are reduced. In addition, each bit value "1" indicates that DMRSs are mapped and transmitted in a corresponding one of the DMRS groups, while each bit value "0" indicates that no DMRS is transmitted in a corresponding one of the DMRS groups. In the examples illustrated in FIGS. 4B and 4D, the bit sequence indicates "1, 0, 1, 0, 1, 0," so that DMRSs are transmitted only in DMRS groups A, C, and E, while no DMRS is transmitted in DMRS groups B, D, and F. The terminal used in these examples performs channel estimation using the DMRSs in DMRS groups A, C, and E.

It should be noted that, the OFDM symbols on which DMRSs are mapped in a special subframe are different from those in a normal DL subframe, but can be divided into six DMRS groups as in the case of DL subframes.

(Extended CP)

Figure 5A:
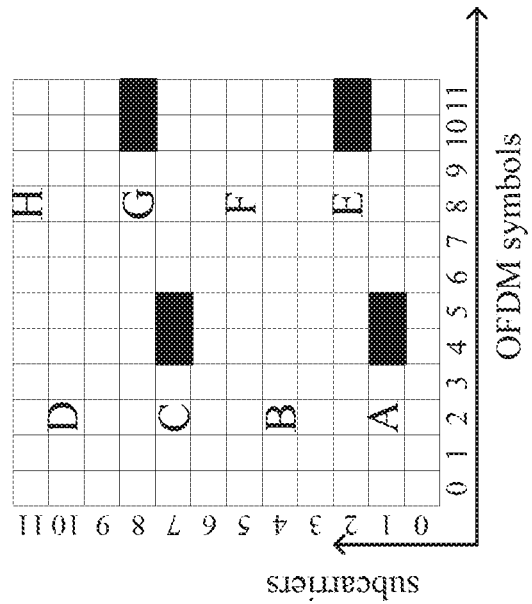
FIGS. 5A and 5B are diagrams illustrating DMRS mapping patterns and signaling in the case of extended CP and DL subframes, according to Embodiment 1 of the present invention.
Figure 5B:
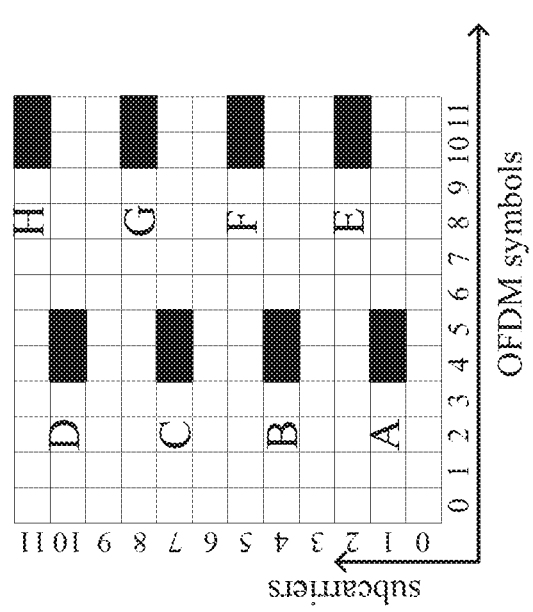

FIGS. 5A and 5B are diagrams illustrating DMRS mapping patterns and signaling in the case of extended CP and DL subframes. In the case of extended CP, only antenna ports #7 and #8 are used, and antenna port #9 or any subsequent antenna ports are not used. In FIGS. 5A and 5B, the number of DMRS groups is set to eight, and the DMRS groups are indicated by A, B, C, D, E, F, and H, respectively. FIG. 5A illustrates a pattern in which no DMRS is reduced, while FIG. 5B illustrates a pattern in which DMRSs are reduced. In the example illustrated in FIG. 5B, the bit sequence indicates "1, 0, 1, 0, 1, 0, 1, 0," so that DMRSs are transmitted only in DMRS groups A, C, E, and while no DMRS is transmitted in DMRS groups B, D, F, and H. The terminal used in this example performs channel estimation using the DMRSs in DMRS groups A, C, E, and G.

As described above, grouping two REs adjacent to each other in the OFDM symbol direction on the same subcarrier, and switching between DMRS transmission and no DMRS transmission make it possible to keep CDMA multiplexing for two antenna ports (#7 and #8, or #9 and #10) by means of OCCs in the two REs in each group. In addition, grouping four REs including two REs on subcarriers adjacent to each other when antenna port #9 is used at least makes it possible to avoid multiplexing of data with a DMRS when an RE not used for a DMRS is allocated to a PDSCH. It should be noted that, when a PDSCH and a DMRS of different antenna ports are multiplexed, the operation of a receiving-side interference canceller becomes complicated.

(Special Operation)

When a bit sequence in which all the bit values are equal to "0" (hereinafter, referred to as "all-0 bit sequence") is defined as a bit sequence indicating not to transmit any DMRS group, the terminal cannot perform channel estimation and thus cannot demodulate a PDSCH in this case. For this reason, the all-0 bit sequence is defined as a bit sequence indicating a special operation. Examples of the special operation will be described, hereinafter.

(Operation Example 1: New Carrier Type (NCT) in which Neither CRS Nor PDCCH is Mapped)

Figures 6A, 6B, 6C:
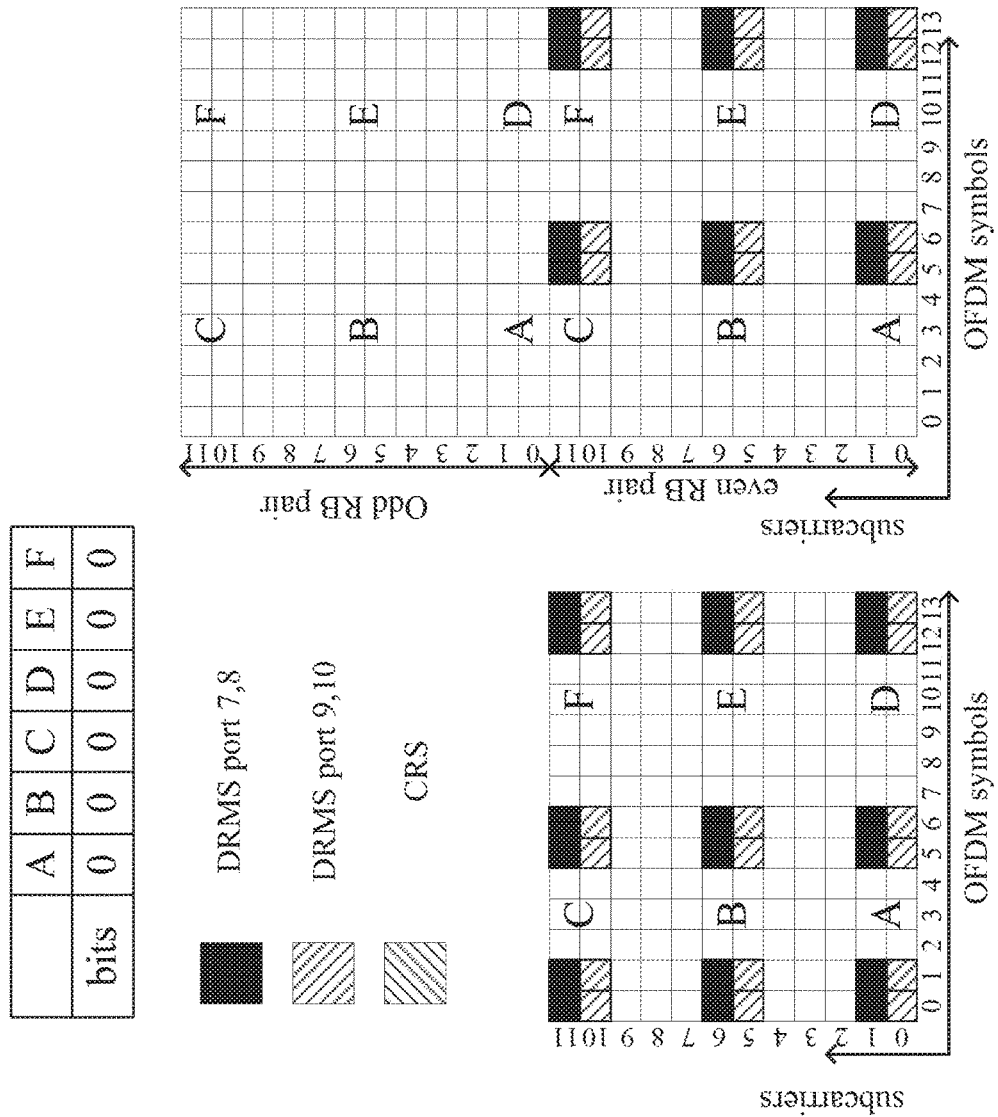
FIGS. 6A to 6C are diagrams each illustrating a DMRS mapping pattern corresponding to a bit sequence in which all the bit values are zero, according to Embodiment 1 of the present invention.

In this example, the all-0 bit sequence is defined to indicate that DMRSs are mapped on the top two OFDM symbols. FIG. 6A is a diagram illustrating an example of a DMRS mapping pattern of this operation example.

In NCT, the operation is supposedly performed using a DMRS and an enhanced PDCCH (EPDCCH) to be demodulated using the DMRS, without mapping any CRS or PDCCH. LTE-Advanced is designed assuming that a DMRS is mapped in a subframe in which a CRS and a PDCCH to be demodulated using the CRS are mapped. Since a PDCCH is mapped on the top OFDM symbol of a subframe, a DMRS is mapped on an OFDM symbol other than the top OFDM symbol. In NCT in which no PDCCH is mapped, using the top OFDM symbol for a PDSCH has been discussed.

However, when a PDSCH is mapped on the top OFDM symbol, the interval between the PDSCH and a DMRS becomes large. As a result, there arises a concern that channel estimation accuracy is degraded. For this reason, DMRSs are mapped on the top two OFDM symbols in this operation example. Accordingly, channel estimation accuracy can be improved for a terminal predicted to have poor channel estimation accuracy.

Operation Example 2

In this operation example, the all-0 bit sequence is defined to indicate that DMRSs are mapped in every other RB pair. FIG. 6B is a diagram illustrating an example of a DMRS mapping pattern of this operation example. In this operation example, DRMSs are mapped only in even RB pairs and no DMRS is mapped on any odd RB pairs. Accordingly, the number of REs in which DMRSs are mapped can be reduced to approximately half.

Operation Example 3

In this operation example, the all-0 bit sequence is defined to indicate that a PDSCH is demodulated using a CRS. FIG. 6C is a diagram illustrating an example of a DMRS mapping pattern of this operation example. In this operation example, no DMRS is mapped but CRSs are mapped, instead. This operation example is particularly effective for a backward compatible carrier type (BCT), which allows connection of all the terminals compliant with releases 8 to 11. Since BCT includes a subframe in which CRSs are transmitted, when precoding for a PDSCH in the subframe can be the same as that for the CRSs, all the REs that are supposed to be used for DMRSs can be used for the PDSCH. Thus, the channel estimation accuracy can be maintained even when DMRS reduction is performed.

Method for Indicating DMRS Mapping Pattern

Hereinafter, a description will be provided regarding a method for indicating a DMRS mapping pattern to a terminal from a base station in Embodiment 1.

(Option 1: Combination of Higher Layer Signaling and DCI Indicating)

In option 1, a base station previously indicates DMRS mapping pattern candidates to a terminal via higher layer signaling, then dynamically selects one of the DMRS mapping pattern candidates and indicates the selected DMRS mapping pattern to the terminal via DCI transmitted on a PDCCH or EPDCCH.

As described above, this two-step indicating can reduce the number of signaling bits used for indicating by DCI. Moreover, dynamic signaling can be performed in common with a PDSCH RE Mapping and Quasi-Co-Location indicator (PQI) transmitted in DCI format 2D. Incidentally, PQI consists of two bits and is information indicating a parameter set configured by higher layers as illustrated in Table 1.

TABLE 1

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Higher layers configure a maximum of four parameter sets. The parameters to be configured are as follows.
Number of CRS antenna ports for PDSCH RE mapping
CRS frequency shift for PDSCH RE mapping
MBSFN subframe configuration for PDSCH RE mapping
Zero-power CSI-RS resource configuration for PDSCH RE mapping
PDSCH starting position for PDSCH RE mapping
CSI-RS resource configuration identity for PDSCH RE mapping In Option 1, "Reduced DMRS pattern" is added to the parameters. Accordingly, a DMRS mapping pattern can be indicated without any increase in the number of bits to be dynamically indicated using DCI. The parameters indicated by PQI are mainly used for specifying CoMP transmission point parameters. Accordingly, it is possible to change a DMRS mapping pattern as well for each transmission point. Thus, each base station can select a DMRS mapping pattern in accordance with the channel quality.

(Option 2: Indicating Via Higher Layer Signaling and (E)PDCCH Set Type)

In Option 2-1, a DMRS mapping pattern is configured for each EPDCCH set (or PDCCH set) via higher layer signaling. LTE-Advanced allows two EPDCCH sets (search spaces) to be configured. Accordingly, a terminal changes a DMRS mapping pattern in accordance with an EPDCCH set by which a PDSCH is assigned. An EPDCCH set can set the number of RB pairs while setting localized allocation or distributed allocation for each set. Thus, the reception quality of a terminal varies for each EPDCCH set. Accordingly, since each base station can select an EPDCCH set and PDCCH set in accordance with the change in the channel quality of a terminal, the base station can select a DMRS mapping pattern in accordance with the channel quality.

In Option 2-2, a DMRS mapping pattern is configured for each candidate EPDCCH position via higher layer signaling. In LTE-Advanced, a plurality of EPDCCH candidate positions is configured for each aggregation level. Each terminal blind-decodes the EPDCCH candidate positions and detects a DL grant and UL assignment. Accordingly, the terminal changes the DMRS mapping pattern in accordance with the position detected from the EPDCCH candidate positions. Thus, since each base station can select an EPDCCH candidate position in accordance with the change in the channel quality of a terminal, the base station can select a DMRS mapping pattern in accordance with the channel quality.

(Option 3: Selection of DMRS Mapping Pattern According to Allocated RB Pairs)

Each terminal selects a DMRS mapping pattern according to the allocated RB pairs. Thus, no DMRS mapping pattern has to be indicated by DCI, so that the number of signaling bits can be reduced.

In Option 3-1, a DMRS mapping pattern is selected according to the number of allocated RB pairs. Each base station assigns a DMRS mapping pattern including a larger number of reduced DMRSs to a terminal allocated the number of RB pairs not less than N, and assigns a DMRS mapping pattern including a smaller number of reduced DMRSs to a terminal allocated the number of RB pairs less than N. The channel quality of a terminal allocated a larger number of RB pairs is good in many cases, so that the base station can select the number of DMRSs to be reduced, in accordance with the channel quality.

In Option 3-2, a DMRS mapping pattern is selected according to the system bandwidth. A precoding resource block group (PRG) size varies depending on the system bandwidth. The term "PRG size" refers to a range of adjacent RB pairs to which the same precoding is supposedly applied. Accordingly, when the PRG size is equal to one, it is possible to assume that different precoding is used for a DMRS in an adjacent RB pair. Thus, the DMRS in the adjacent RB pair cannot be used. In this case, the base station assigns a DMRS mapping pattern including a smaller number of reduced DMRSs. Meanwhile, when the PRG size is equal to two or greater, it is possible to assume that the same precoding is used for an adjacent RB pair. In this case, the base station assigns a DMRS mapping pattern having a larger number of reduced DMRSs.

In Option 3-3, a DMRS mapping pattern is selected according to the allocated number of contiguous RB pairs. Each base station assigns a DMRS mapping pattern including a larger number of reduced DMRSs to a terminal allocated the number of contiguous RB pairs not less than M, and assigns a DMRS mapping pattern including a smaller number of reduced DMRSs to a terminal allocated the number of contiguous RB pairs less than M. The channel quality correlation between contiguously mapped RB pairs is predicted to be high, so that each terminal can perform channel estimation using a value obtained by interpolating DMRSs between the RB pairs. Accordingly, it is possible to minimize the degradation of reception quality due to the DMRS reduction even when the number of reduced DMRSs is increased in this case.

In Option 3-4, a DMRS mapping pattern is selected according to the allocated RB pair number or resource block group (RBG) number. Each base station determines the DMRS mapping pattern according to the top RB pair number or RBG number of the allocated resources. The DMRS mapping pattern can be flexibly determined by changing the RB to be allocated to the top of the allocation resources. When the number of patterns is represented by X, the pattern may be determined by modulo operation of X and the RB pair or DMRS number.

It is to be noted that, Embodiment 1 has been described regarding the case where the bit sequence that specifies a DMRS mapping pattern is indicated by higher layers, but Embodiment 1 is not limited to this case, and the bits included in DL DCI may be used for indicating as the bits specifying a DMRS mapping pattern. Accordingly, a plurality of DMRS mapping patterns can be dynamically selected.

(Configuration of Communication System)

A communication system according to Embodiment 1 includes a transmission apparatus and a reception apparatus.

In particular, Embodiment 1 will be described with base station 100 as an example of the transmission apparatus and terminal 200 as an example of the reception apparatus. This communication system is an LTE-Advanced system, for example. In addition, base station 100 is a base station compliant with the LTE-Advanced system and terminal 200 is compliant with the LTE-Advanced system, for example.

(Main Configuration of Base Station 100)

Figure 7:
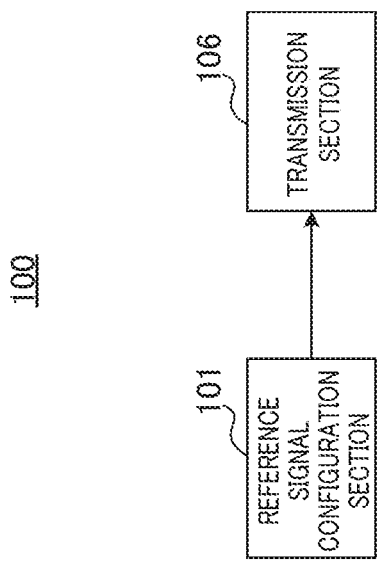
FIG. 7 is a block diagram illustrating a primary configuration of a base station according to Embodiment 1 of the present invention.

FIG. 7 is a block diagram illustrating a primary configuration of base station 100 according to Embodiment 1.

In base station 100, reference signal configuration section 101 generates DMRSs and configures a DMRS mapping pattern for each terminal 200. In addition, reference signal configuration section 101 outputs DMRSs and information indicating the configured DMRS mapping pattern.

Transmission section 106 transmits a transmission signal including the information indicating the DMRS mapping pattern configured by reference signal configuration section 101 and the DMRSs mapped according to the DMRS mapping pattern to terminal 200.

(Primary Configuration of Terminal 200)

Figure 8:
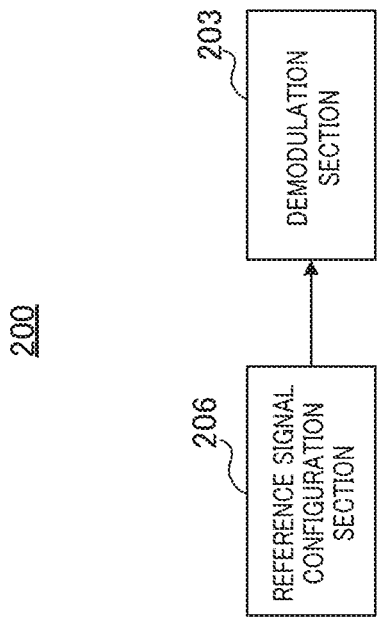
FIG. 8 is a block diagram illustrating a primary configuration of a terminal according to Embodiment 1 of the present invention.

FIG. 8 is a block diagram illustrating a primary configuration of terminal 200 according to Embodiment 1.

In terminal 200, reference signal configuration section 206 configures a DMRS mapping pattern based on a control signal included in a received signal. In addition, reference signal configuration section 206 outputs information indicating the DMRS mapping pattern.

Demodulation section 203 identifies the positions of DMRSs based on the information indicating the DMRS mapping pattern, which is received from reference signal configuration section 206, then performs channel estimation using the DMRSs and demodulates the data signal.

(Configuration of Base Station 100)

Figure 9:
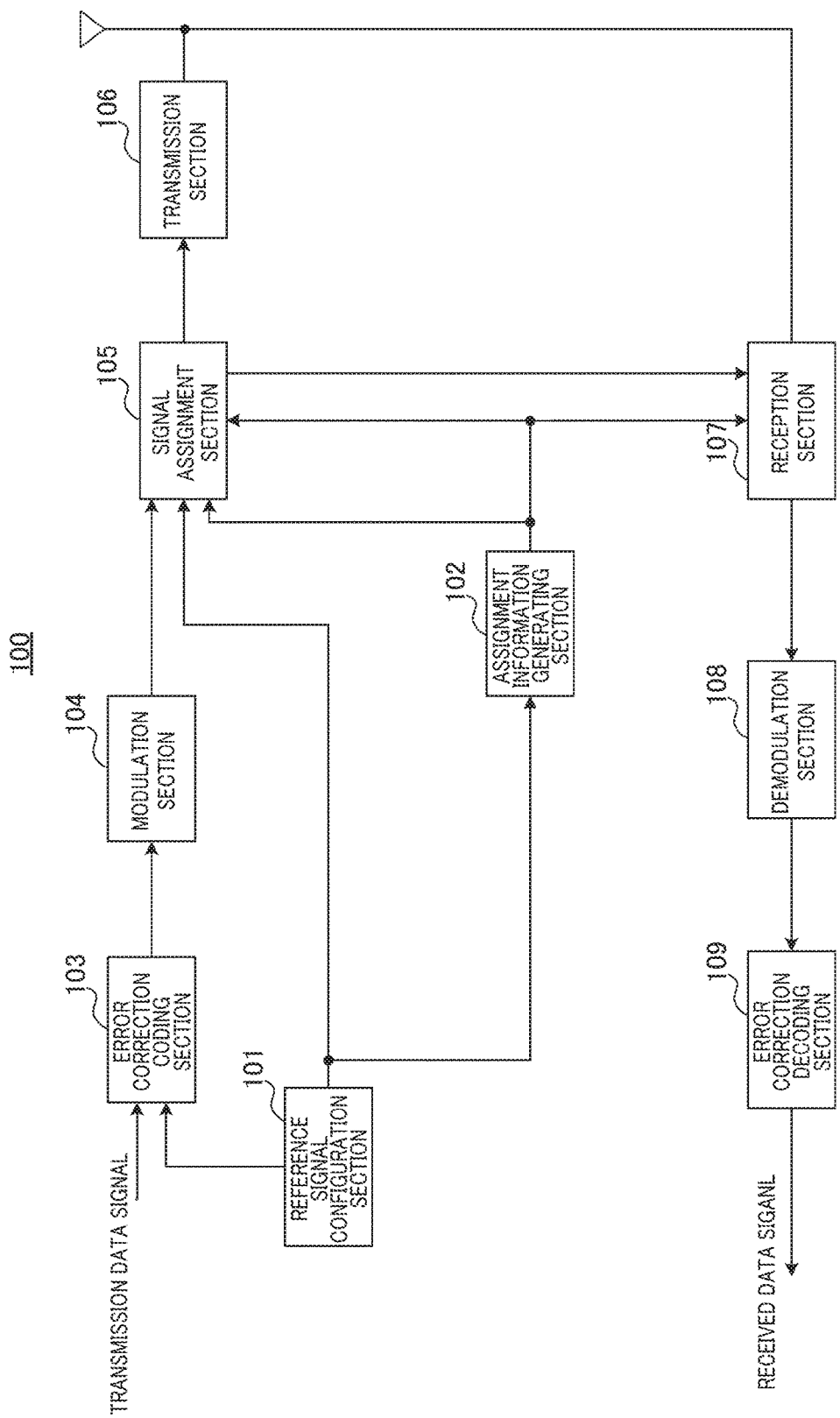
FIG. 9 is a block diagram illustrating a configuration of the base station according to Embodiment 1 of the present invention.

FIG. 9 is a block diagram illustrating a configuration of base station 100 according to Embodiment 1. Referring to FIG. 9, base station 100 includes reference signal configuration section 101, assignment information generating section 102, error correction coding section 103, modulation section 104, signal assignment section 105, transmission section 106, reception section 107, demodulation section 108, and error correction decoding section 109.

Reference signal configuration section 101 generates DMRSs. In addition, reference signal configuration section 101 determines a DMRS mapping pattern for each terminal 200. Specifically, reference signal configuration section 101 selects some candidates from all of the mapping patterns. In addition, reference signal configuration section 101 determines a final DMRS mapping pattern for each subframe.

Reference signal configuration section 101 outputs higher layer signaling indicating the selected mapping pattern candidates to error correction coding section 103 as a control signal. Reference signal configuration section 101 also outputs the generated DMRSs and information indicating the DMRS mapping pattern selected from the candidates to signal assignment section 105.

When a downlink data signal (DL data signal) to be transmitted and an uplink data signal (UL data signal) to be assigned to the uplink (UL) are present, assignment information generating section 102 determines resources (RB pairs) to which the data signal is assigned, and generates assignment information (DL assignment and UL grant). The DL assignment includes information about the DL data signal assignment and information indicating the DMRS mapping pattern received from reference signal configuration section 101. The UL grant includes information about an allocated resource for the UL data signal to be transmitted from terminal 200. The DL assignment is outputted to signal assignment section 105. The UL grant is outputted to signal assignment section 105 and reception section 107.

Error correction coding section 103 uses, as input, the transmission data signal (DL data signal), and the control signal received from reference signal configuration section 101, then performs error correction coding on the input signals and outputs the resultant signal to modulation section 104.

Modulation section 104 performs modulation processing on the received signal and outputs the modulated signal to signal assignment section 105.

Signal assignment section 105 assigns the assignment information, which includes the information indicating the DMRS mapping pattern, and which is received from assignment information generating section 102 (DL assignment and UL grant), to an EPDCCH or PDCCH. In addition, signal assignment section 105 assigns the data signal received from modulation section 104 to a downlink resource corresponding to the assignment information (DL assignment) received from assignment information generating section 102. Moreover, signal assignment section 105 assigns the DMRSs received from reference signal configuration section 101 on the basis of the information indicating the DMRS mapping pattern, which is also received from reference signal configuration section 101. It should be noted that, signal assignment section 105 assigns a PDSCH (data signal) to an RE corresponding to a reduced DMRS in a PDSCH region.

As described above, a transmission signal is formed by assignment of the assignment information, DMRSs, and data signal to predetermined resources. The transmission signal thus formed is outputted to transmission section 106.

Transmission section 106 performs transmission processing such as up-conversion or the like on the received signal and transmits the processed signal to terminal 200 via an antenna.

Reception section 107 receives, via an antenna, a signal transmitted from terminal 200 and outputs the received signal to demodulation section 108. Specifically, reception section 107 demultiplexes, from the received signal, a signal corresponding to the resources indicated by the UL grant received from assignment information generating section 102, then performs reception processing such as down-conversion on the demultiplexed signal and outputs the processed signal to demodulation section 108. Reception section 107 (extracts) receives an A/N signal from a signal corresponding to a PUCCH resource associated with an ECCE index received from signal assignment section 105.

Demodulation section 108 performs demodulation processing on the received signal and outputs the processed signal to error correction decoding section 109.

Error correction decoding section 109 decodes the received signal to obtain a received data signal from terminal 200.

(Configuration of Terminal 200)

Figure 10:
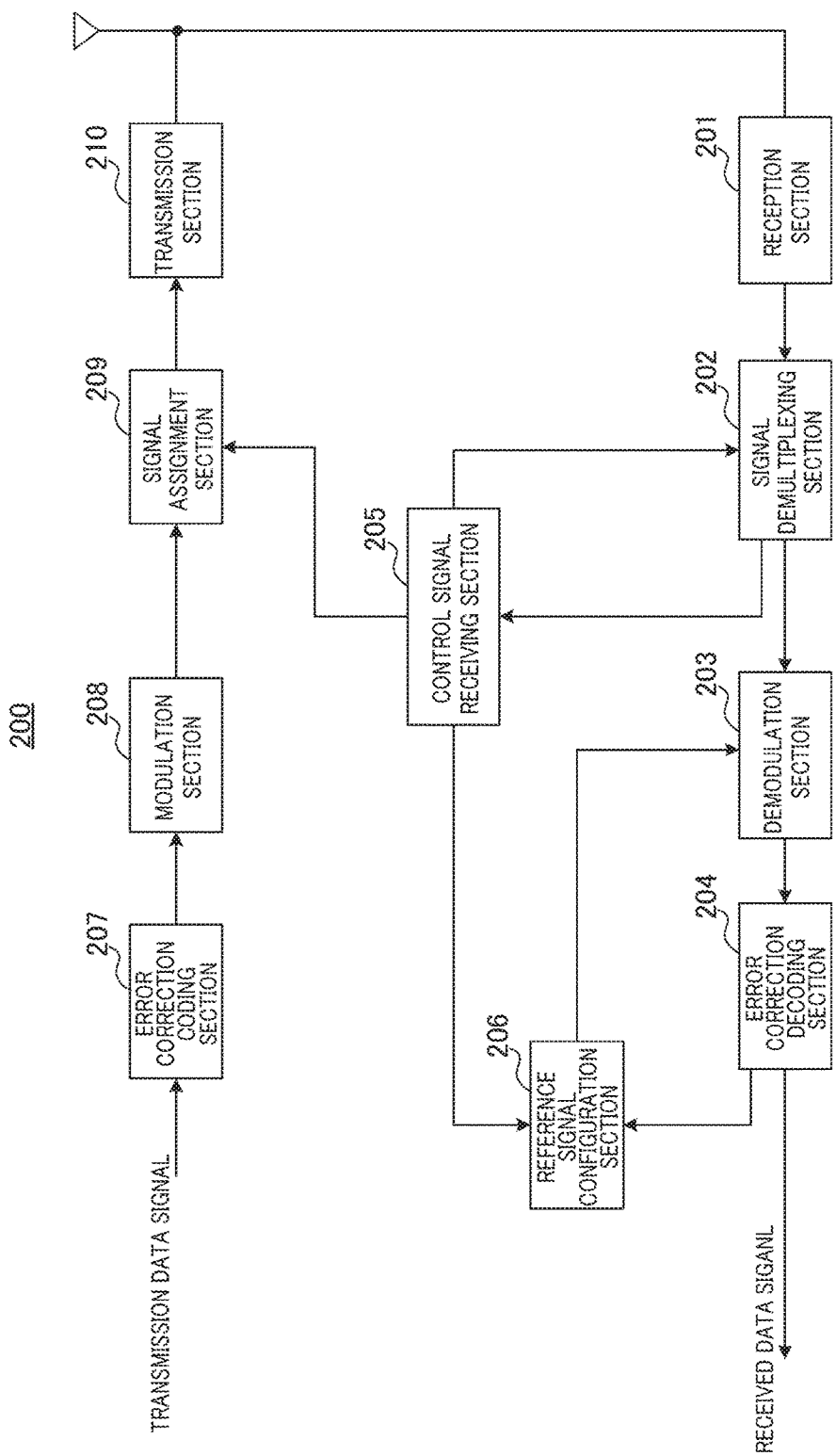
FIG. 10 is a block diagram illustrating a configuration of the terminal according to Embodiment 1 of the present invention.

FIG. 10 is a block diagram illustrating a configuration of terminal 200 according to Embodiment 1. Referring to FIG. 10, terminal 200 includes reception section 201, signal demultiplexing section 202, demodulation section 203, error correction decoding section 204, control signal receiving section 205, reference signal configuration section 206, error correction coding section 207, modulation section 208, signal assignment section 209, and transmission section 210.

Reception section 201 receives, via an antenna, a signal transmitted from base station 100, then performs reception processing such as down-conversion on the received signal and outputs the processed signal to signal demultiplexing section 202.

Signal demultiplexing section 202 extracts a control signal for resource allocation from the received signal, which is received from reception section 201, and outputs the control signal to control signal receiving section 205. In addition, signal demultiplexing section 202 extracts, from the received signal, a signal corresponding to the data resources (i.e., DL data signal) indicated by DL assignment outputted from control signal receiving section 205 and outputs the extracted signal to demodulation section 203.

Demodulation section 203 identifies the positions of DMRSs on the basis of the information indicating the DMRS mapping pattern, which is received from reference signal configuration section 206, and performs channel estimation using the DMRSs. Demodulation section 203 demodulates the signal outputted from signal demultiplexing section 202 on the basis of the channel estimation and outputs the demodulated signal to error correction decoding section 204.

Error correction decoding section 204 decodes the received signal to obtain the received data signal from base station 100. Error correction decoding section 204 particularly outputs the control signal indicating the DMRS mapping pattern candidates to reference signal configuration section 206.

Control signal receiving section 205 detects a control signal (DL assignment or UL grant) intended for terminal 200 by blind-decoding signal components received from signal demultiplexing section 202. More specifically, control signal receiving section 205 receives a control signal assigned to one of a plurality of assignment candidates forming a search space configured in reference signal configuration section 206. Control signal receiving section 205 outputs the detected DL assignment intended for terminal 200 to signal demultiplexing section 202 and outputs the detected UL grant intended for terminal 200 to signal assignment section 209. Control signal receiving section 205 also outputs the information indicating the DMRS mapping pattern, which is included in the DL assignment, to reference signal configuration section 206.

Reference signal configuration section 206 determines the final DMRS mapping pattern on the basis of the control signal indicating the DMRS mapping pattern candidates outputted from error correction decoding section 204 and the information indicating the DMRS mapping pattern determined from the candidates, which is outputted from control signal receiving section 205. Reference signal configuration section 206 outputs the information indicating the determined DMRS mapping pattern to demodulation section 203.

Error correction coding section 207 receives the transmission data signal (UL data signal) as input, then performs error correction coding on the received signal and outputs the processed signal to modulation section 208.

Modulation section 208 modulates the received signal and outputs the modulated signal to signal assignment section 209.

Signal assignment section 209 assigns the received signal according to the UL grant received from control signal receiving section 205 and outputs the resultant signal to transmission section 210.

Transmission section 210 performs transmission processing such as up-conversion on the received signal and transmits the processed signal to base station 100 via an antenna.

As described above, according to Embodiment 1, a DMRS mapping pattern can be configured for each terminal. Thus, it is possible to map DMRSs in a way adapted to the reception environment of each terminal and thereby to minimize the degradation of reception quality due to the DMRS reduction. For example, it is possible to assign a mapping pattern in which DMRSs are reduced in the time-domain direction to a low-mobility terminal, while assigning a mapping pattern in which DMRSs are reduced in the frequency-domain direction to a terminal with small delay spread. Moreover, a data signal can be assigned to the REs corresponding to the reduced DMRSs, which enables communication with a higher transmission rate.

Variation of Embodiment 1

In this variation, when a plurality of RB pairs is allocated, a DMRS mapping pattern is changed according to the RB pair number in order to improve channel estimation accuracy. In particular, if the same DMRS mapping pattern is used for all of the RB pairs in a case where the number of DMRSs assigned to the OFDM symbols in the first slot (OFDM symbols #5 and #6 in the case of normal CP) is different from the number of DMRSs assigned to the OFDM symbols in the second slot (OFDM symbols #12 and #13 in the case of normal CP), imbalance in DMRS mapping occurs in the time-domain direction. When DMRSs are mapped out of balance, imbalance in DMRS transmission power per OFDM symbol also occurs. For this reason, in order to equalize the number of DMRSs on each of the OFDM symbols where DMRSs are mapped, the mapping of the DMRS groups is reversed between the first slot and second slot of an odd-numbered RB pair with respect to the mapping of DMRS groups in an even-numbered RB pair.

Figure 11B:
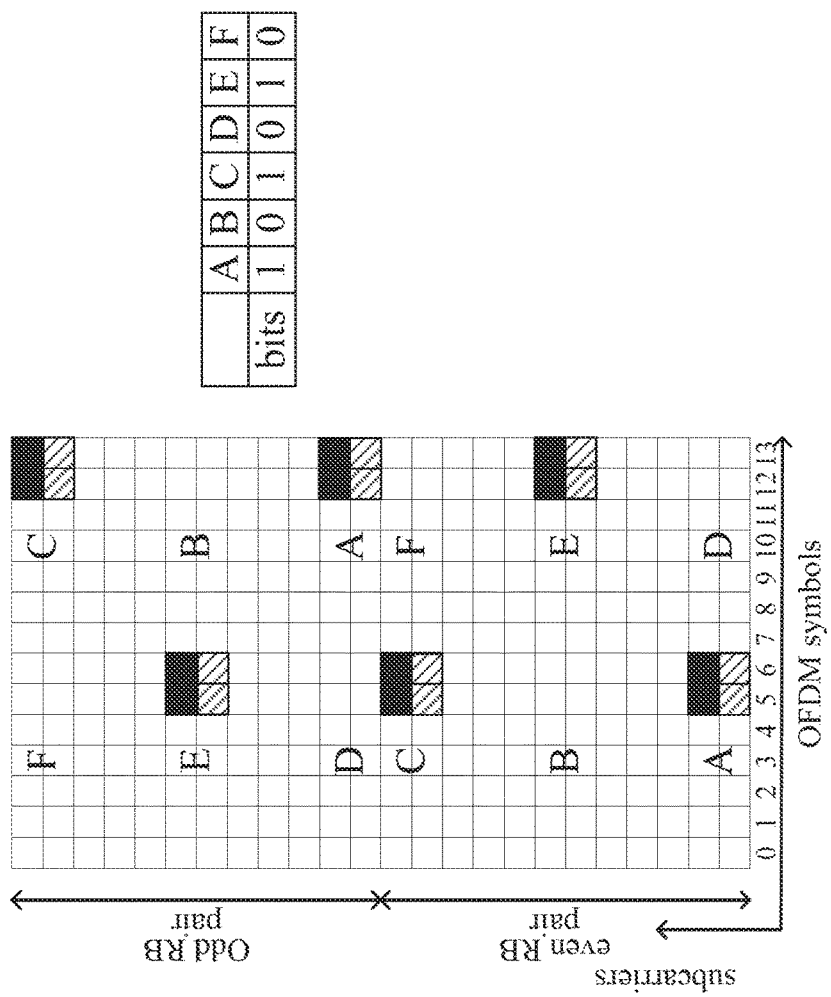
FIGS. 11A and 11B are diagrams illustrating an example of a DMRS mapping pattern in a variation of Embodiment 1 of the present invention.
Figure 11A:
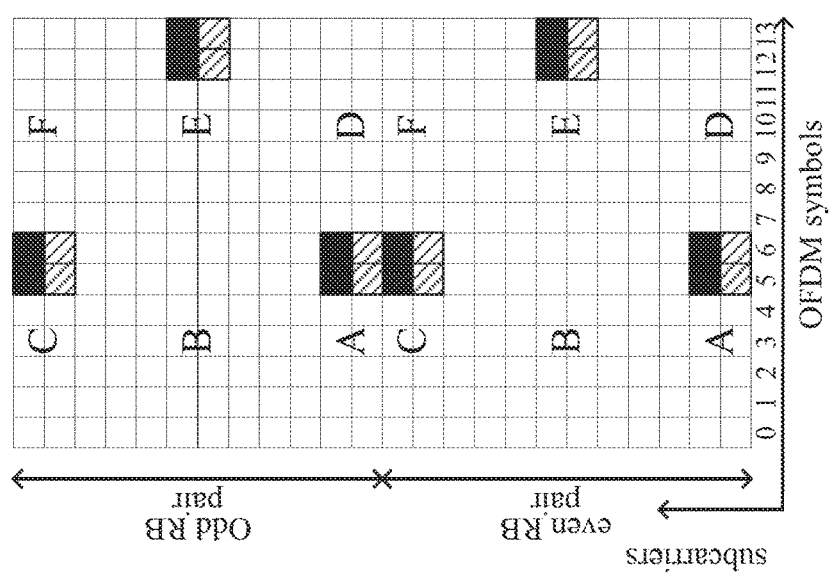

FIGS. 11A and 11B and 12A and 12B are diagrams illustrating examples of DMRS mapping patterns in this variation. FIGS. 11A and 11B illustrate an example of a bit sequence, ABCDEF=101010, which indicates a case where the number of DMRS groups is different between the first slot and second slot. When no reversal is made between the first slot and second slot (see, FIG. 11A), ABC correspond to the first slot (OFDM symbols #5 and #6) and DEF correspond to the second slot (OFDM symbols #12 and #13) in both of the even PRB pair and the odd PRB pair. As a result, the number of DMRSs transmitted on OFDM symbols #5 and #6 is different from the number of DMRSs transmitted on OFDM symbols #12 and #13. When the mapping of DMRS groups is reversed between the first slot and second slot of the odd RB pair with respect to the mapping of DMRS groups in the even RB pair (see, FIG. 11B), ABC correspond to the first slot and DEF correspond to the second slot in the even PRB pair, while ABC correspond to the second slot and DEF correspond to the first slot in the odd-numbered PRB pair. As a result, the number of DMRSs on the OFDM symbols on which the DMRSs are mapped can be equalized. Thus, the DMRS transmission power on the OFDM symbols on which the DMRSs are mapped can be equal to each other.

Figure 12B:
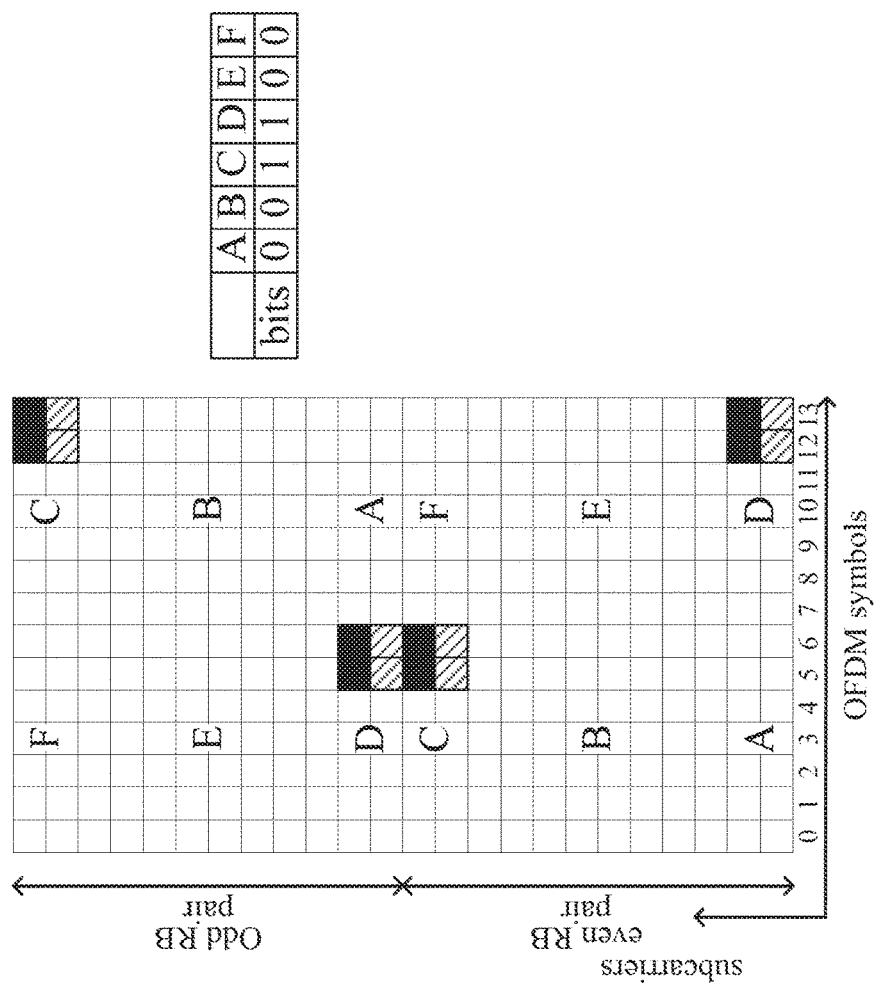
FIGS. 12A and 12B are diagrams illustrating another example of the DMRS mapping pattern in the variation of Embodiment 1 of the present invention.
Figure 12A:
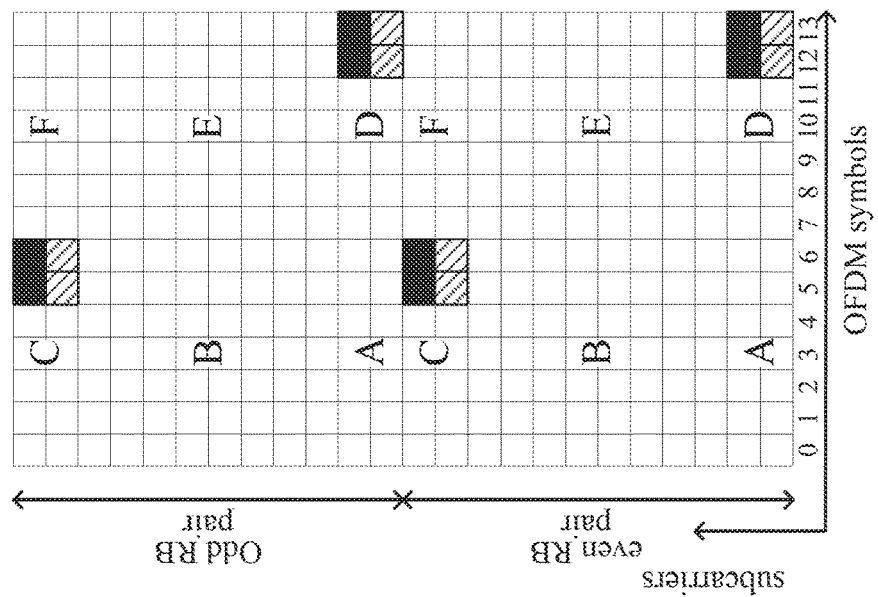

It should be noted that, this variation is applied only to a case where the number of DMRS groups is different between the first and second slots and does not have to be applied to a case where the number of DMRS groups is the same. FIGS. 12A and 12B illustrate an example of a bit sequence, ABCDEF=001100, which indicates a case where the number of DMRS groups is the same between the first slot and second slot. When no reversal is made between the first slot and second slot (see, FIG. 12A), the interval between the DMRSs on the same OFDM symbol cannot be greater than or equal to 12 subcarriers. However, when reversal is made between the first slot and second slot (see, FIG. 12B), the interval between the DMRSs on the same OFDM symbol may become equal to or greater than 12 subcarriers. When the interval in the frequency-domain direction is too large, the channel estimation accuracy in the frequency-domain direction is degraded. For this reason, in order to prevent the degradation of channel estimation accuracy in the frequency-domain direction, this variation is applied only to a case where the number of DMRS groups is different between the first slot and second slot and is not applied to a case where the number of DMRS groups is the same between the first slot and second slot.

Embodiment 2

(Summary)

In Embodiment 2, hopping which changes the positions of DMRS groups every subframe is applied with respect to a DMRS mapping pattern. Because of the application of hopping, DMRSs are mapped in mutually different resources in a plurality of subframes. Each terminal in this case can thus perform channel estimation for a PDSCH using a value obtained by interpolating these DMRSs, which in turn can improve the channel estimation accuracy.

As a method of hopping, there are random hopping which changes a resource according to a rule different for each terminal on the basis of the default value, and cyclic shift hopping which performs cyclic shifting in the time-domain (subframe) direction or in the frequency-domain (subcarrier) direction on the basis of the default value.

In random hopping, a different resource is selected in each subframe on a per terminal or cell basis. Accordingly, even when DMRSs are configured so as to avoid a collision between DMRSs using default values, a collision between DMRSs may occur in a different subframe. For this reason, random hopping can randomize interference rather than coordinating interference. Accordingly, random hopping is effective when coordination between base stations is difficult.

On the other hand, in cyclic shift hopping, DMRSs configured so as to avoid a collision using default values can avoid a collision in the next subframe as well. Accordingly, it is possible to coordinate interference using the default values. However, when DMRSs collide with each other in the configuration using the default values, DMRSs also collide with each other in the next subframe. For this reason, cyclic shift hopping is effective when coordination between base stations is easy.

Figure 13:
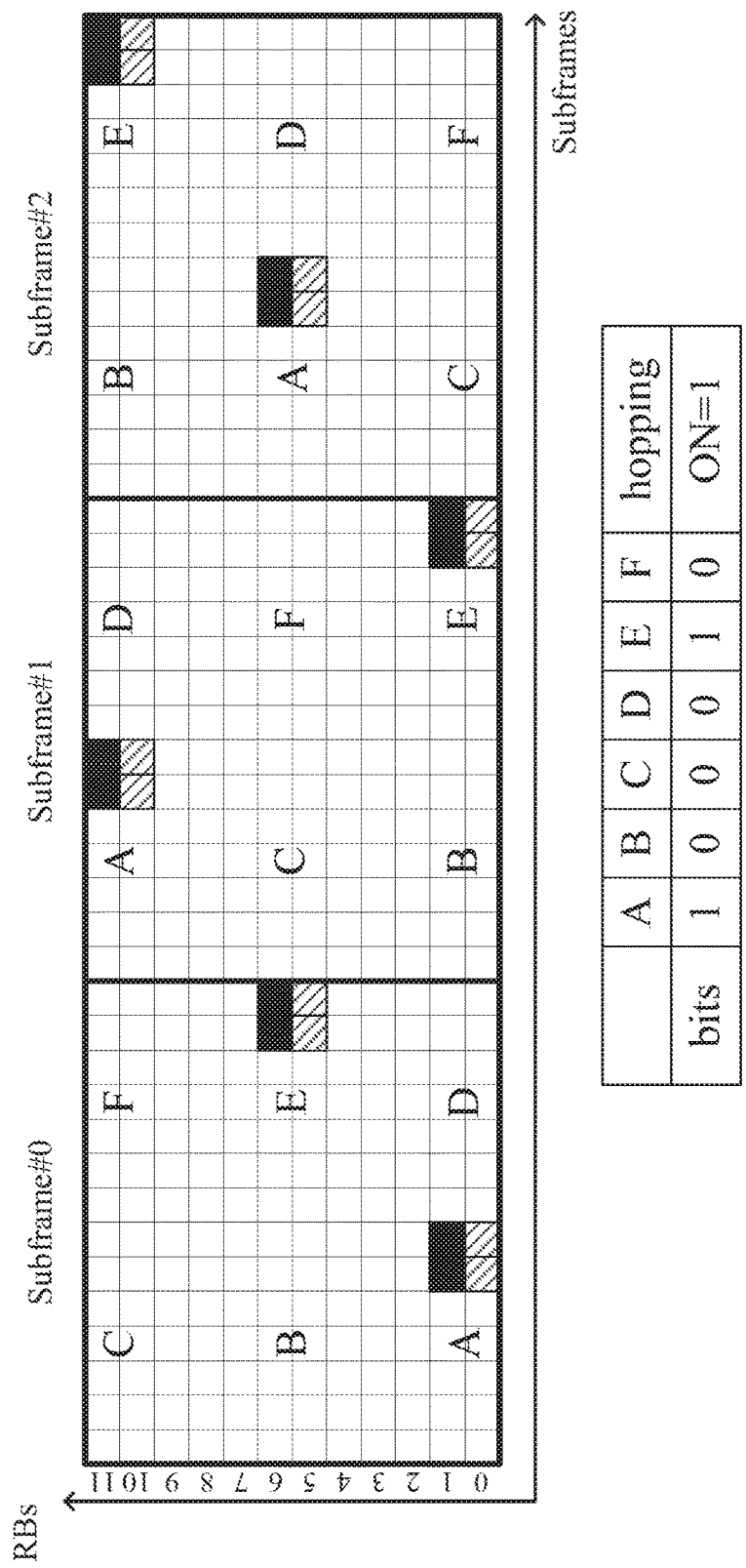
FIG. 13 is a diagram illustrating an example of a DMRS mapping pattern according to Embodiment 2 of the present invention.

FIG. 13 is a diagram illustrating an example of a DMRS mapping pattern according to Embodiment 2. FIG. 13 illustrates an example of cyclic shift hopping. The DMRS mapping pattern of this example corresponds to a bit sequence, ABCDEF=1000101. In this example, DMRS groups are cyclically shifted in the frequency-domain direction on the same OFDM symbols in each subframe. Accordingly, shifting of resources is performed among DMRS groups ABC, while shifting of resources is performed among DMRS groups DEF. For example, DMRS group A is mapped on subcarriers #0 and #1 in subframe 0 and is mapped on subcarriers #10 and #11 in subframe #1, while being mapped on subcarriers #5 and #6 in subframe 2.

As described above, when cyclic shift hopping of DMRS groups in the frequency-domain is applied, the amount of resources used for transmitting DMRSs on the OFDM symbols on which the DMRSs are mapped remains the same between subframes. Thus, the channel estimation accuracy in the time-domain can be kept at the same level as that of the initial mapping of DMRSs.

In addition, when random hopping is applied, it is preferable to configure a hopping pattern for each terminal or cell. When a different hopping pattern is configured for each terminal, a terminal ID (UEID) or C-RNTI can be used for calculating the hopping pattern for each terminal. Accordingly, each terminal can be configured with a different hopping pattern. Moreover, when a different hopping pattern is configured for each base station, a base station ID (e.g., physical cell ID (PCI)) can be used for calculating the hopping pattern for each base station. Accordingly, each base station can be configured with a different hopping pattern.

In addition, as illustrated in FIG. 13, higher layer signaling may be added for indicating hopping ON/OFF. When hopping is ON, each terminal receives DMRSs according to a previously specified hopping pattern, and when hopping is OFF, each terminal receives DMRSs while assuming that no hopping is applied. Furthermore, higher layer bits may be added as follows to specify hopping ON/OFF and hopping patterns in a more detail manner. This addition of higher layer bits improves flexibility.

| 00 | hopping off |
| 01 | cyclic shift hopping |
| 10 | UE specific random hopping |
| 11 | Cell specific random hopping |

Embodiment 2 is effective when a plurality of subframes is assigned to a single terminal in particular. Assigning a plurality of subframes to a single terminal simultaneously is called "multi-subframe assignment." When a terminal is assigned multi-subframes, the terminal recognizes that the plurality of subframes is intended for the terminal and thus can assume that the DMRSs mapped in the plurality of subframes correspond to the same precoding. Accordingly, the terminal can perform channel estimation using a value obtained by interpolating DMRSs of the adjacent subframes. In this case, when DMRSs are mapped on different subcarriers between subframes, the channel estimation accuracy in the frequency-domain direction can be improved. In this respect, when random hopping or cyclic shift hopping between subframes is applied, DMRSs are mapped on different subcarriers between the subframes. Thus, the channel estimation accuracy in the frequency-domain direction can be improved.

It should be noted that, although Embodiment 2 has been described regarding a case where hopping which changes a DMRS mapping pattern between subframes is applied, the present invention is not limited to this case, and hopping that changes a DMRS mapping pattern between RBs may be applied. In particular, when the amount of resources for DMRSs are different between the first slot and second slot, applying hopping in the time-domain direction can equalize the amount of resources for DMRS by DMRS hopping, which enables equalization of the DMRS transmission power.

Additional Embodiments (1) Although a PDSCH is mapped in the REs corresponding to reduced DMRSs in Embodiments 1 and 2, no PDSCH is mapped in the REs corresponding to reduced DMRSs. Stated differently, the power for the DMRSs is set to zero. A DMRS of this kind is called a zero power DMRS. In particular, additional embodiment (1) provides an advantage in that even when DMRSs are transmitted using increased transmission power, there is no increase in the amount of interference to a PDSCH or DMRS between terminals each configured with a DMRS pattern in such a way as to avoid overlapping of DMRS mapping between terminals.

Figure 14B:
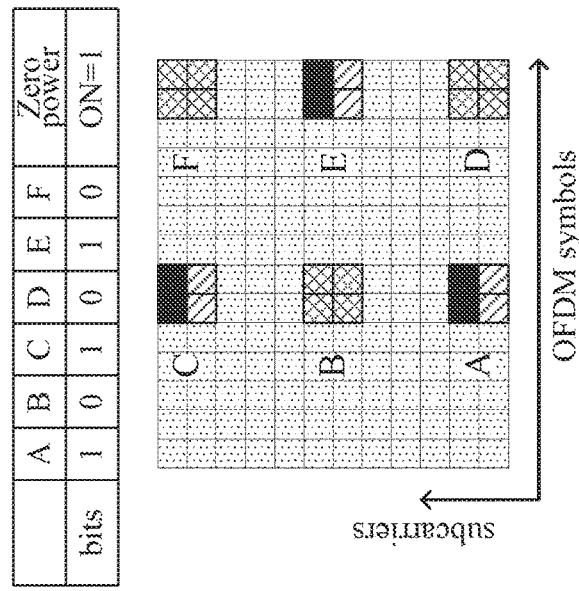
FIGS. 14A and 14B are diagrams illustrating an example of a DMRS mapping pattern according to additional embodiment 1 of the present invention.
Figure 14A:
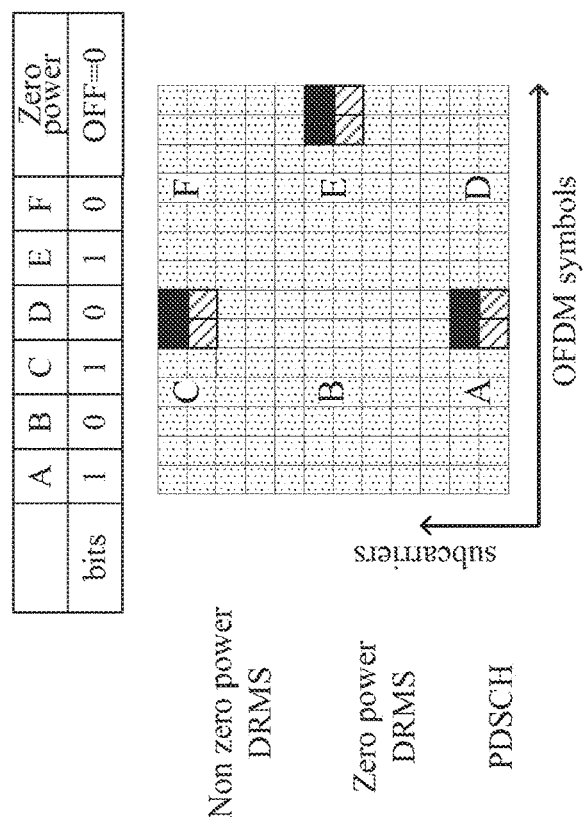

FIGS. 14A and B are diagrams each illustrating an example of a DMRS mapping pattern according to additional embodiment (1). FIG. 14 illustrates an example in which zero power DMRSs are applied. In this example, one bit is added to higher layer signaling to indicate ON/OFF of zero power DMRS. When zero power DMRS is OFF (see, FIG. 14A), a PDSCH is mapped and transmitted in the REs corresponding to the DMRS groups in which no DMRSs are mapped. When zero power DMRS is ON (see, FIG. 14B), no PDSCH is mapped in the REs corresponding to the DMRS groups in which no DMRSs are mapped.

(2) As described above, when a terminal is assigned multi-subframes, the terminal recognizes that the plurality of subframes is intended for the terminal and thus can assume that the DMRSs mapped in the plurality of subframes correspond to the same precoding. However, since no DMRS in the previous subframe can be used in the first assigned subframe, the channel estimation accuracy of the top part OFDM symbols is degraded. For this reason, DMRSs are mapped in both of the slots in the top subframe.

Figure 15:
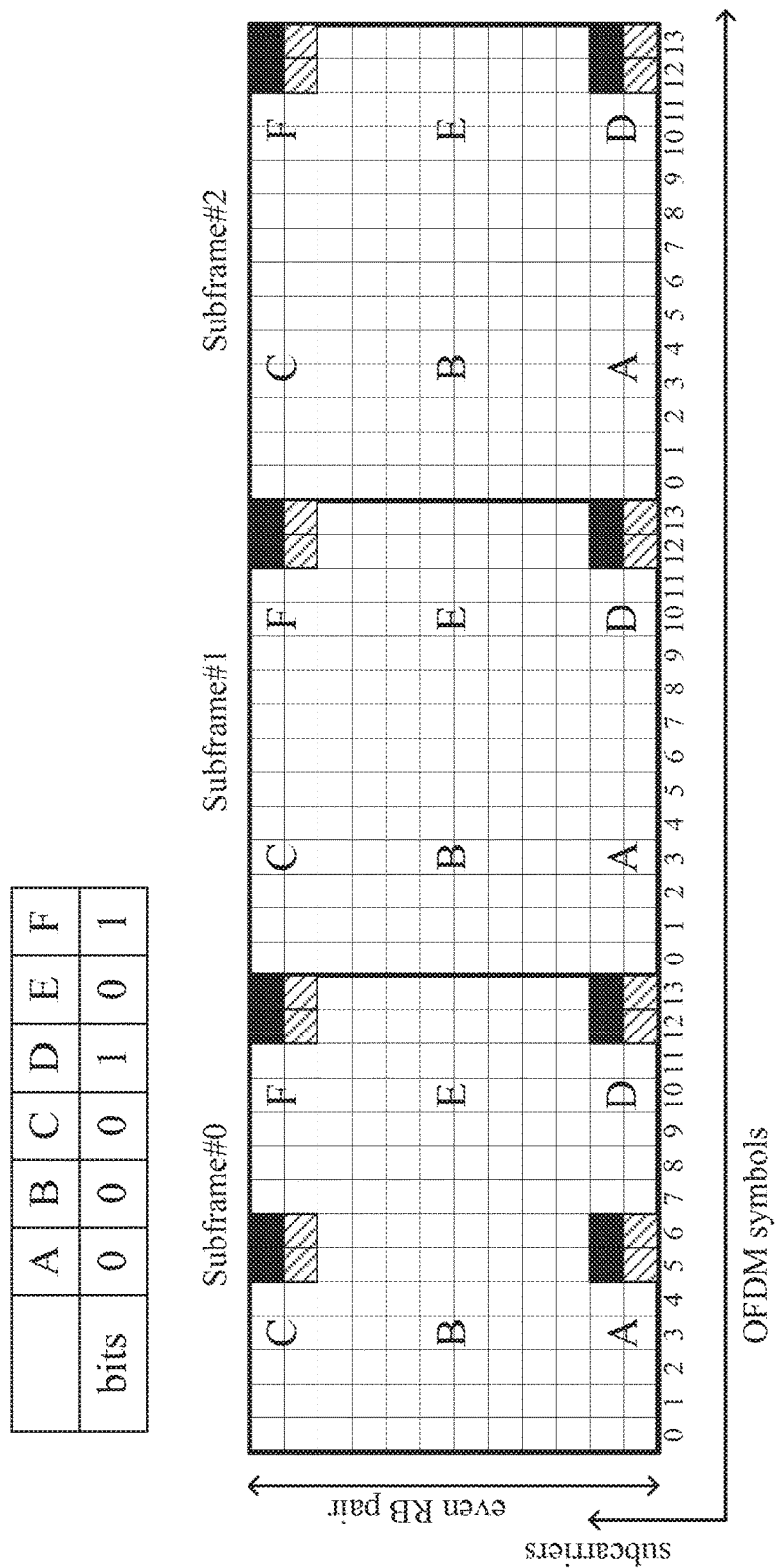
FIG. 15 is a diagram illustrating an example of a DMRS mapping pattern according to additional embodiment 2 of the present invention.

FIG. 15 is a diagram illustrating an example of a DMRS mapping pattern according to additional embodiment (2). The DMRS mapping pattern in FIG. 15 corresponds to a bit sequence, ABCDEF=000101, which is a pattern in which DMRSs are mapped only in the second slot. In addition, in the example illustrated in FIG. 15, contiguous subframes 0, 1, and 2 are assigned. In this case, DMRSs are mapped on DMRS groups D and F in subframes 1 and 2 according to the DMRS mapping pattern, and a PDSCH is mapped in the other DMRS resources. Meanwhile, DMRSs are mapped in the first slot in subframe 0, which is the first subframe. The mapping pattern in the first slot uses the same subcarriers as those used in the second slot. Accordingly, the channel estimation accuracy of the first assigned subframe can be improved.

In this additional embodiment, the DMRS mapping pattern used in the first slot is configured to be identical with those configured in the second slot. However, DMRSs may be mapped in all DMRS groups A, B, and C in the first slot. Accordingly, the same format can be used with any DMRS mapping pattern.

(3) In additional embodiment (3), application of a DMRS mapping pattern is limited for the purpose of supporting MU-MIMO. When MU-MIMO is applied, it is easier to remove interference between DMRSs if the REs in which the DMRSs are mapped are the same between terminals. Particularly, in multiplexing for antenna port #7 and antenna port #8 by means of OCCs, since the DMRSs are orthogonally multiplexed when DMRSs are mapped on the same REs, the terminal can remove interference between the DMRSs and thus can improve the channel estimation accuracy. In addition, MU-MIMO is used mainly using antenna ports #7 and #8. In LTE-Advanced, whether or not MU-MIMO is applied is not indicated to terminals. Accordingly, each terminal receives signals intended for the terminal without knowing whether or not MU-MIMO is applied.

Figure 16B:
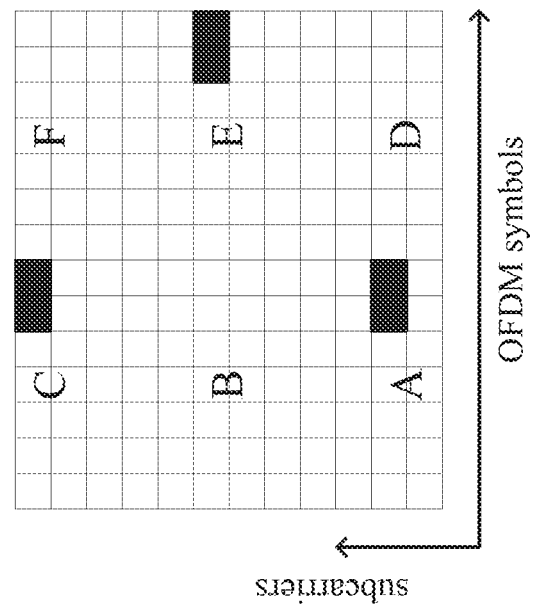
FIGS. 16A and 16B are diagrams illustrating an example of a DMRS mapping pattern according to additional embodiment 3 of the present invention.
Figure 16A:
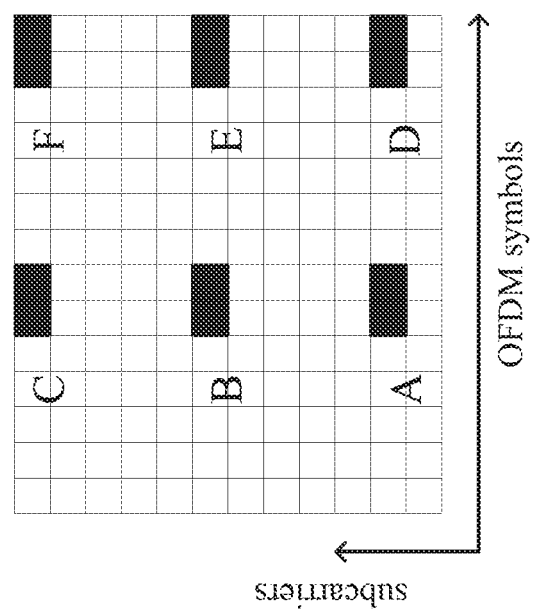

In this respect, in additional embodiment (3), a base station is configured to map, when antenna ports #7 and #8 are assigned, but antenna port #9 is not assigned, DMRSs on all DMRS groups (all DMRS-mappable REs) (see, FIG. 16A) or to map DMRSs according to a predetermined DMRS mapping pattern (see, FIG. 16B) even in a DMRS mapping pattern in which DMRSs are reduced. Accordingly, the same DMRS mapping pattern is used between terminals forming a pair in MU-MIMO, and interference between DMRSs can be removed in each terminal. The predetermined DMRS mapping pattern used in this case may be a pattern common to all the terminals, or may be a different pattern configured for each terminal according to the UE-ID or the like of the terminal. When the predetermined DMRS mapping pattern is different between terminals, for transmission of DMRSs in the same REs, the base station selects terminals assigned the same DMRS mapping pattern, as an MU-MIMO pair.

As described above, terminals cannot determine whether or not MU-MIMO is applied, because of the assignment of antenna ports #7 and #8, but the terminals can configure the same DMRS assignment resources by changing a DMRS mapping pattern, when MU-MIMO is applied.

Figure 17C:
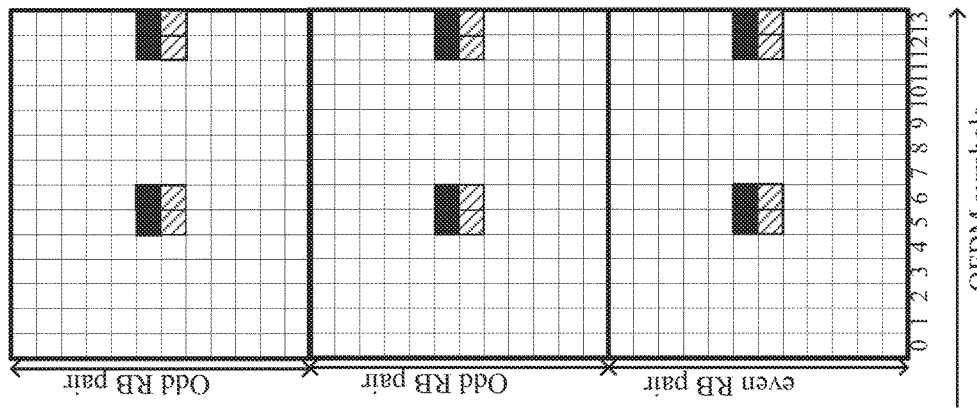
FIGS. 17A to 17C are diagrams illustrating examples of a DMRS mapping pattern according to additional embodiment 4 of the present invention.
Figure 17B:
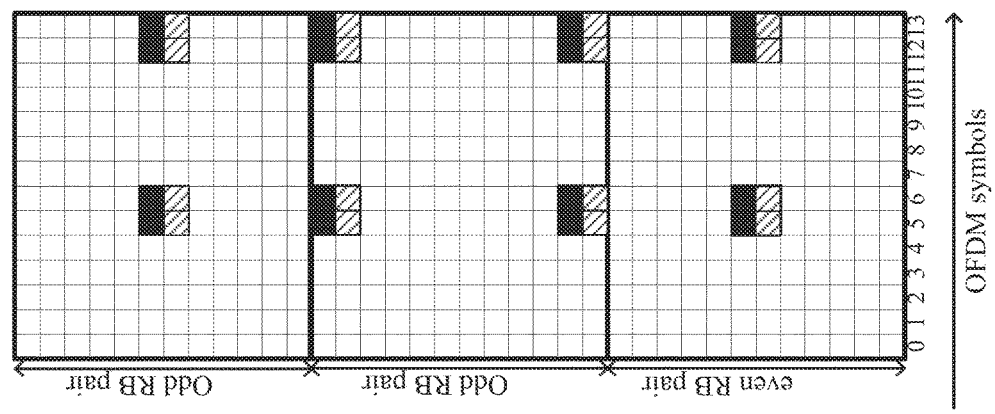
Figure 17A:
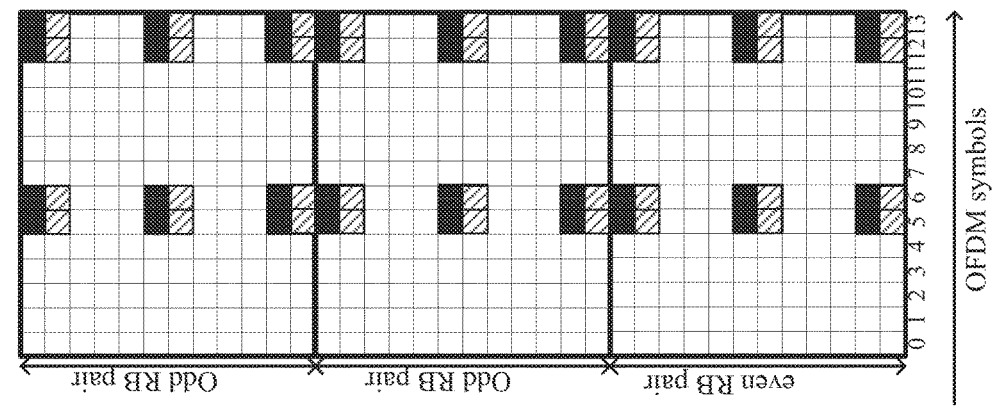

(4) In additional embodiment (4), a base station may indicate the intervals (in frequency-domain or time-domain direction) between DMRS groups in which DMRSs are mapped to a terminal. In this case, the terminal determines the transmission positions of DMRSs over a plurality of RB pairs according to the intervals. FIGS. 17A, B, and C are diagrams illustrating examples of DMRS mapping patterns according to additional embodiment (4). FIGS. 17A, B, and C illustrate examples when the intervals in the frequency-domain direction are indicated. FIG. 17A illustrates an example in which DMRSs are mapped according to the current mapping pattern. FIG. 17B illustrates an example in which DMRSs are mapped in every other DMRS group in the frequency-domain direction using the current mapping pattern as the basis. FIG. 17C is an example in which DMRSs are mapped in every third DMRS group in the frequency-domain direction using the current mapping pattern as the basis. In the current mapping of DMRS groups, some DMRS groups are mapped at the boundary between RB pairs in the frequency-domain. Since these DMRS groups are mapped adjacent to each other, the channel estimation accuracy for the resources near the DMRSs groups is excessively high. In FIG. 17B, since DMRSs are transmitted only in one of the two adjacent DMRS groups, the number of DMRSs can be reduced while the degradation of channel estimation accuracy in the frequency-domain direction is minimized. It should be noted that, in this embodiment, the number of indicating bits can be reduced as compared with the case where the presence or absence of DMRS transmission in six DMRS groups is indicated, individually.

(5) In the present invention, the elements of each DMRS group may be mapped in a different order. Hereinafter, a description will be provided regarding an example of a case where the elements of each DMRS group are "abcd." Elements abcd of length-4 OCC are expressed by the following equation.

$$W_4 = \begin{pmatrix} 1 & 1 & 1 & 1 \\ 1 & -1 & 1 & -1 \\ 1 & 1 & -1 & -1 \\ 1 & -1 & -1 & 1 \end{pmatrix} = (a \ b \ c \ d)$$

[Equation 1]

Figure 18A:
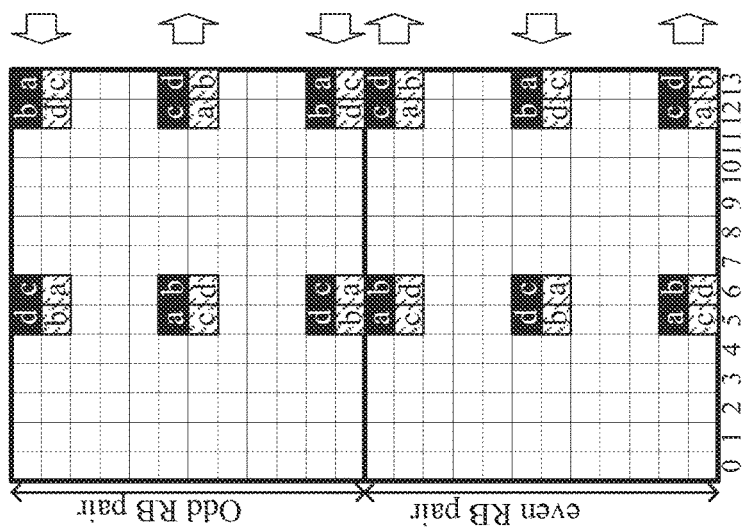
FIGS. 18A to 18C are diagrams illustrating examples of a DMRS mapping pattern according to additional embodiment 5 of the present invention.
Figure 18B:
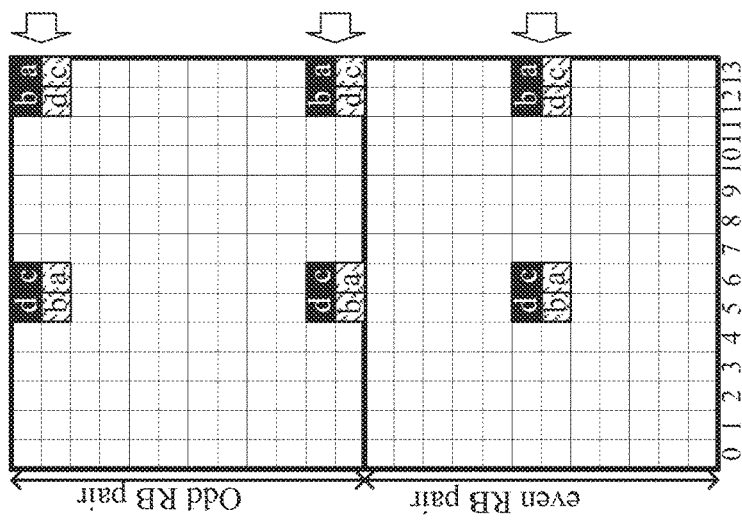
Figure 18C:
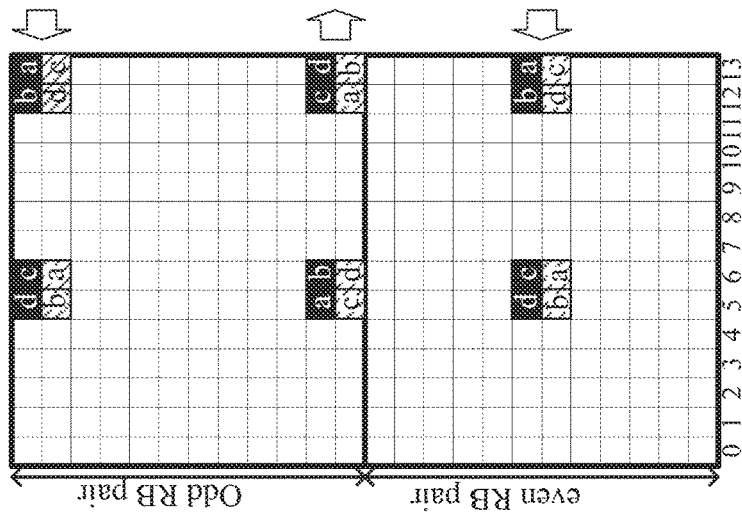

As illustrated in FIG. 18A, abcd is mapped in such a way that a different element is allocated to each antenna port, and for antenna ports #7, #8, #11, and #13, the elements in ascending order abed ("→" in the drawings) and the elements in descending order dcba ("←" in the drawings), which is reversal of the ascending order, are alternately mapped in the frequency-domain. In this manner, transmission of the same phase signals on the OFDM symbols is prevented. Likewise, for antenna ports #9, #10, #12, and #14, the elements in the order, cdab ("→" in the drawings), and the elements in the order reversal to the order, badc ("←" in the drawings) are alternately mapped. However, when every other DMRS group is mapped in the frequency-domain direction (see, FIG. 18B), only the OCC sequences of the same order ("←" in the drawings) are selected, which in turn deteriorates the power balance. For this reason, as illustrated in FIG. 18C, it is possible to define that the ascending order and descending order are alternately used in DMRS groups to be transmitted.

[Others]

[1] In the present invention, a DMRS mapping pattern is not applied to an EPDCCH transmitted in a PDSCH region. Mapping of an EPDCCH is defined in such a way as to avoid an RE on which a DMRS is mapped. In addition, an RE on which an EPDCCH is mapped is shared by a plurality of terminals. For this reason, when a different mapping pattern is configured for each terminal, it becomes difficult to map an EPDCCH on the same RB.

[2] In the present invention, a DMRS mapping pattern may be applied to an EPDCCH transmitted in a PDSCH region. In this case, the DMRS mapping pattern may be indicated by higher layers when an EPDCCH set is assigned. In this manner, the code rate of EPDCCH can be reduced, and the resource usage efficiency can be improved when the channel quality is good.

[3] In the present invention, the application of a DMRS mapping pattern may be limited in such a way that a DMRS mapping pattern is applied only when a scheme with a larger M-ary modulation number (such as 16QAM, 64QAM, or 256QAM) or a scheme with a higher coding rate is used. DMRS reduction is effective when the channel quality is good. When the channel quality is good, a scheme with a larger M-ary modulation number is used. Likewise, a when the channel quality is good, a scheme using a higher coding rate is used.

Accordingly, the application of a DMRS mapping pattern may be limited in such a way that a DMRS mapping pattern is applied only when a scheme with a larger M-ary modulation number or a scheme using a higher coding rate is used. With this configuration, since a mapping pattern in which no DMRS is reduced is used when the channel quality is poor, the DMRS reception quality can be secured. In LTE, these m-ary number and coding rate are determined according to the modulation and coding scheme (MCS) table. Thus, whether or not to apply a DMRS mapping pattern may be determined according to the index of the MCS table.

[4] In Embodiment 1, the unit of DMRSs indicated by a single bit (i.e., DMRS group) is defined as a group of four REs corresponding to two adjacent REs in the subcarrier direction and two adjacent REs in the OFDM symbol direction when the number of antenna ports is at least three (i.e., when antenna port #9 is used). However, the present invention is by no means limited to this case, and the unit of DMRSs may be defined as two adjacent OFDM symbols. In this case, the number of bits required for indicating is 12 bits. With this configuration, the number of DMRSs to be reduced can be configured separately between antenna ports #7, #8, #11, and #13, and antenna ports #9, #10, #12, and #14. For example, when antenna ports #7 to #10 are used in a certain cell while antenna ports #7 and #8 are used in another cell, the number of resources to be used by the cell can be reduced in order to reduce interference to the DMRSs of the other cell.

[5] In the present invention, a base station may indicate DMRS groups in a plurality of RBs to a terminal, simultaneously. For example, when there are six DMRS groups per RB pair, 12 DMRS groups are simultaneously indicated using 12 bits for two RB pairs, and 18 DMRS groups are simultaneously indicated using 18 bits for three RB pairs, and the pattern is repeated every two RB pairs, or every three RB pairs. Specifically, when an assignment with a small number of DMRS groups is selected, a pattern which is well balanced in the time-domain and frequency-domain directions can be selected.

[6] The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, 3GPP LTE does not specify the number of physical antennas forming an antenna port, but specifies an antenna port as a minimum unit allowing a base station to transmit a different reference signal.

In addition, an antenna port may be specified as a minimum unit for multiplication of a precoding vector weighting.

[7] The above-noted embodiments have been described by examples of hardware implementations, but the present invention can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A transmission apparatus according to an aspect of the embodiments includes: a reference signal configuration section that configures a demodulation reference signal (DMRS) mapping pattern for each reception apparatus; and a transmission section that transmits a transmission signal including information indicating the DMRS mapping pattern, and a DMRS mapped in a resource according to the DMRS mapping pattern.

The transmission apparatus according to an aspect of the embodiments employs a configuration in which the reference signal configuration section configures the DMRS mapping pattern for each subframe.

The transmission apparatus according to an aspect of the embodiments employs a configuration in which the reference signal configuration section configures the DMRS mapping pattern by determining whether or not to map the DMRS in each DMRS group including a plurality of adjacent resource units in which the DMRS is mappable.

The transmission apparatus according to an aspect of the embodiments employs a configuration in which the reference signal configuration section configures the DMRS mapping pattern by previously indicating candidates for the DMRS mapping pattern to each reception apparatus via higher layer signaling, and thereafter dynamically selecting one of the candidates for the DMRS mapping pattern.

The transmission apparatus according to an aspect of the embodiments employs a configuration in which the reference signal configuration section configures the DMRS mapping pattern for each enhanced physical downlink control channel (EPDCCH) set or PDCCH set via higher layer signaling.

The transmission apparatus according to an aspect of the embodiments employs a configuration in which the reference signal configuration section configures the DMRS mapping pattern for each EPDCCH candidate position via higher layer signaling.

The transmission apparatus according to an aspect of the embodiments employs a configuration in which the reference signal configuration section selects the DMRS mapping pattern according to the number of allocated RB pairs.

The transmission apparatus according to an aspect of the embodiment employs a configuration in which the reference signal configuration section selects the DMRS mapping pattern according to a system bandwidth.

The transmission apparatus according to an aspect of the embodiments employs a configuration in which the reference signal configuration section selects the DMRS mapping pattern according to the number of allocated contiguous RB pairs.

The transmission apparatus according to an aspect of the embodiment employs a configuration in which the reference signal configuration section selects the DMRS mapping pattern according to an allocated RB pair number or resource block group (RBG) number.

The transmission apparatus according to an aspect of the embodiments employs a configuration in which: the DMRS mapping pattern includes the DMRS group in both of a first slot formed including a first-half RB of the PRB pair and a second slot including a second-half RB of the PRB pair; and the reference signal configuration section reverses mapping of the DMRS group between the first slot and second slot of one of an odd-numbered RB pair and an even-numbered RB pair with respect to mapping of the DMRS group between the first slot and second slot of the other one of the odd-numbered RB pair and the even-numbered RB pair.

The transmission apparatus according to an aspect of the embodiments employs a configuration in which the information indicating the DMRS mapping pattern is a bit sequence that indicates, using a single bit, whether or not to map the DMRS in each of the DMRS groups.

The transmission apparatus according to an aspect of the embodiments employs a configuration in which a first bit sequence that indicates not to map the DMRS in any of the DMRS groups indicates a different operation.

The transmission apparatus according to an aspect of the embodiments employs a configuration in which the first bit sequence indicates to map the DMRS on top two OFDM symbols.

The transmission apparatus according to an aspect of the embodiments employs a configuration in which the first bit sequence indicates to map the DMRS in every other resource block (RB) pair.

The transmission apparatus according to an aspect of the embodiments employs a configuration in which the first bit sequence indicates to demodulate a physical downlink shared channel (PDSCH) using a cell specific reference signal (CRS).

The transmission apparatus according to an aspect of the embodiments employs a configuration in which the reference signal configuration section changes a position of the DMRS group for each subframe.

The transmission apparatus according to an aspect of the embodiments employs a configuration in which the reference signal configuration section changes a position of the DMRS group between RBs.

The transmission apparatus according to an aspect of the embodiments employs a configuration in which the reference signal configuration section assigns a PDSCH to a resource unit of a DMRS group in which the DMRS is not mapped.

The transmission apparatus according to an aspect of the embodiments employs a configuration in which the reference signal configuration section sets transmission power of a resource unit of a DMRS group in which the DMRS is not mapped to zero.

The transmission apparatus according to an aspect of the embodiments employs a configuration in which: the DMRS mapping pattern includes the DMRS group in both of a first slot including a first-half RB of a PRB pair and a second-half of the PRB pair; and when selecting a DMRS mapping pattern in which the DMRS is mapped only in the DMRS group in the second slot and also assigning a plurality of subframes to a predetermined reception apparatus, the reference signal configuration section maps the DMRS in the DMRS group in the first slot of a top subframe.

The transmission apparatus according to an aspect of the embodiments employs a configuration in which, when antenna ports #7 and #8 are assigned but antenna port #9 is not assigned, the reference signal configuration section maps a DMRS in all DMRS groups, or maps a DMRS according to a predetermined DMRS mapping pattern.

The transmission apparatus according to an aspect of the embodiments employs a configuration in which the transmission section includes information in the transmission signal, the information indicating an interval in a frequency-domain direction or a time-domain direction between DMRS groups in which the DMRS is to be mapped.

The transmission apparatus according to an aspect of the embodiments employs a configuration in which the reference signal configuration section configures resource units of each of the DMRS groups to be mapped in a different order.

The transmission apparatus according to an aspect of the embodiments employs a configuration in which the reference signal configuration section alternately uses an ascending order and a descending order for mapping of the resource units of the DMRS groups in which the DMRS is to be mapped.

A reception apparatus according to an aspect of the embodiments includes: a reference signal configuration section that configures a DMRS mapping pattern based on a control signal included in a received signal; and a demodulation section that identifies a position of a DMRS based on the DMRS mapping pattern, then performs channel estimation using the DMRS, and demodulates a data signal.

A control signal mapping method according to an aspect of the embodiments includes: configuring a demodulation reference signal (DMRS) mapping pattern for each reception apparatus; and transmitting a transmission signal including information indicating the DMRS mapping pattern and a DMRS mapped in a resource according to the DMRS mapping pattern.

A demodulation method according to an aspect of the embodiments includes: configuring a DMRS mapping pattern based on a control signal included in a received signal; identifying a position of a DMRS based on the DMRS mapping pattern; performing channel estimation using the DMRS; and demodulating a data signal.

INDUSTRIAL APPLICABILITY

The present invention is suitable for use in mobile communication systems compliant with LTE-Advanced.

REFERENCE SIGNS LIST

100 Base station
200 Terminal
101, 206 Reference signal configuration section
102 Assignment information generating section
103, 207 Error correction coding section
104, 208 Modulation section
105, 209 Signal assignment section
106, 210 Transmission section
107, 201 Reception section
108, 203 Modulation section
109, 204 Error correction decoding section
202 Signal demultiplexing section
205 Control signal receiving section

The invention claimed is:

1. A communication apparatus comprising:
a receiver, which in operation, receives candidate information relating to a plurality of mapping patterns of a Demodulation Reference Signal (DMRS) via higher layers and receives downlink control information indicating a mapping pattern of the DMRS from among the plurality of mapping patterns; and
circuitry, which in operation, determines a plurality of resource elements used for the mapping pattern based on the candidate information and the downlink control information.

2. The communication apparatus according to claim 1, wherein a number of the resource elements is different among each of the plurality of mapping patterns.

3. The communication apparatus according to claim 1, wherein a number of resource elements in a first half of a time unit is larger than that in a second half of the time unit for at least one of the plurality of mapping patterns, the time unit being configured of 14 Orthogonal Frequency-Division Multiplexing (OFDM) symbols.

4. The communication apparatus according to claim 1, wherein the downlink control information includes a plurality of bits that indicate the mapping pattern from among the plurality of mapping patterns.

5. The communication apparatus according to claim 1, wherein two adjacent Orthogonal Frequency-Division Multiplexing (OFDM) symbols are used for a DMRS transmission for at least one of the plurality of mapping patterns.

6. The communication apparatus according to claim 1, wherein data is received on resource elements which are not used for a transmission of the DMRS.

7. The communication apparatus according to claim 1, wherein the downlink control information is transmitted on a Physical Downlink Control Channel (PDCCH) or an Enhanced Physical Downlink Control Channel (EPDCCH).

8. The communication apparatus according to claim 1, wherein each of the plurality of DMRS mapping patterns has a different density of DMRS in a frequency domain.

9. The communication apparatus according to claim 1, wherein each of the plurality of DMRS mapping patterns has a different density of DMRS in a time domain.

10. A communication method comprising:
receiving candidate information relating to a plurality of mapping patterns of a Demodulation Reference Signal (DMRS) via higher layers;
receiving downlink control information indicating a mapping pattern of the DMRS from among the plurality of mapping patterns; and
determining a plurality of resource elements used for the mapping pattern based on the candidate information and the downlink control information.

11. The communication apparatus according to claim 10, wherein a number of the resource elements is different among each of the plurality of mapping patterns.

12. The communication apparatus according to claim 10, wherein a number of resource elements in a first half of a time unit is larger than that in a second half of the time unit for at least one of the plurality of mapping patterns, the time unit being configured of 14 Orthogonal Frequency-Division Multiplexing (OFDM) symbols.

13. The communication apparatus according to claim 10, wherein the downlink control information includes a plurality of bits that indicate the mapping pattern from among the plurality of mapping patterns.

14. The communication apparatus according to claim 10, wherein two adjacent Orthogonal Frequency-Division Multiplexing (OFDM) symbols are used for a DMRS transmission for at least one of the plurality of mapping patterns.

15. The communication apparatus according to claim 10, wherein data is received on resource elements which are not used for a transmission of the DMRS.

16. The communication apparatus according to claim 10, wherein the downlink control information is transmitted on Physical Downlink Control Channel (PDCCH) or Enhanced Physical Downlink Control Channel (EPDCCH).

17. The communication apparatus according to claim 10, wherein each of the plurality of DMRS mapping patterns has a different density of DMRS in a frequency domain.

18. The communication apparatus according to claim 10, wherein each of the plurality of DMRS mapping patterns has a different density of DMRS in a time domain.

\* \* \* \* \*